US005956434A

United States Patent [19]

Shibata et al.

[11] Patent Number: 5,956,434

[45] Date of Patent: Sep. 21, 1999

[54] SEMICONDUCTOR OPERATIONAL CIRCUIT

[76] Inventors: Tadashi Shibata, 5-2, Nihondaira, Taihaku-ku, Sendai-shi, Miyagi-ken 982-02; Tadahiro Ohmi, 1-17-301, Komegabukuro 2-chome, Aoba-ku Sendai-shi Miyagi-ken 980, both of Japan

[21] Appl. No.: 08/930,548

[22] PCT Filed: Apr. 1, 1996

[86] PCT No.: PCT/JP96/00885

§ 371 Date: Nov. 7, 1997

§ 102(e) Date: Nov. 7, 1997

[87] PCT Pub. No.: WO96/30854

PCT Pub. Date: Oct. 3, 1996

[30] Foreign Application Priority Data

Mar. 31, 1995 [JP] Japan .................................... 7-100460

[51] Int. Cl.[6] ........................... G06K 15/316; G06K 9/64

[52] U.S. Cl. ........................... 382/278; 382/103; 382/107; 382/291; 382/304; 382/307; 382/312; 382/318; 364/133; 364/134; 364/159; 364/167.05; 364/468.28; 364/489; 364/490; 364/712; 348/80; 348/87; 348/154

[58] Field of Search .................................... 382/103, 107, 382/278, 291, 304, 312, 318, 307; 348/80, 87, 154; 364/133, 134, 159, 167.05, 468.28, 489, 490, 712, 715.012, 728.03, 736.04, 768; 702/57, 116, 117, 118

[56] References Cited

U.S. PATENT DOCUMENTS 5,497,343 3/1996 Rarick .................................... 364/787

5,586,202 12/1996 Ohki et al. .............................. 382/236

FOREIGN PATENT DOCUMENTS 4-294469 10/1992 Japan .............................. G06F 15/70

*Primary Examiner*—Jose L. Couso

*Assistant Examiner*—Kanji Patel

*Attorney, Agent, or Firm*—Randall J. Knuth

[57] ABSTRACT

The present invention has as an object thereof to provide a semiconductor operational circuit which is capable of instantaneously processing in parallel a large quantity of information. The semiconductor operational circuit of the present invention which executes a predetermined operation with respect to a first signal train of signals $A_1, A_2, \ldots, A_{N-1}, A_N$ (where N is a positive integer) of N signals numbered from 1 to N, and a second signal train of signals $B_1, B_2, \ldots, B_{M-1}, B_M$ (where M is a positive integer) of M signals numbered from 1 to M, comprising a plurality of first operational circuits for executing a predetermined operation with respect to $A_i$, and $B_{i+n}$ (where i is a positive integer and n is a positive or negative integer and $1 \leqq i \leqq n$ and $1 \leqq i + n \leqq M$) and generating an output signal $C_{i,n}$, at least one second operational circuit for generating the sum $S_n$ of a part or the whole of output signals of the first operational circuits with respect to a predetermined value of n, where i has differing values, or for generating a predetermined signal $T_n$, determined by the sum $S_n$, and a third operational circuit for finding the value of $S_n$ or $T_n$, with respect to a plurality of different n values and for determining the n value for which the maximum or minimum value of $S_n$ or $T_n$ is given.

16 Claims, 19 Drawing Sheets

| (t-Δt DATA)-(t DATA) |

| (t DATA)-(t÷Δt DATA) |

SEMICONDUCTOR OPERATIONAL CIRCUIT

BACKGROUND OF THE INVENTION

1. Field of the Invention

The present invention relates to a semiconductor operational circuit, and in particular, relates to an operational circuit which is applied to high speed image processing or the like.

2. Description of the Related Art

In recent years, in concert with the development in computer technology, the progress in the field of data processing technology has been truly remarkable. However, when attempts as were made to realize the flexible type of data processing conducted by human beings, it was almost impossible to obtain the results of such calculations in real time using present computers. The reasons advanced for this are that the data which human beings process in the course of their daily lives are analog data, and these data are vague. It is thus a problem in present data processing systems that the extremely redundant analog data are all converted into digital values, and rigorous digital operations are conducted one by one.

An example of this is image processing. For example, if one screen is incorporated into a 500×500 two dimensional array, then the total number of pixels is 250, 000, and when the strength of the three colors red, green, and blue for each pixel is expressed in terms of 8 bits, then the amount of data in one stationary image reaches 750,000 bits. In moving images, the amount of image data increases with time.

Present day computers conduct data processing with respect to enormous amounts of digital signals by repetitive operations, so that an enormous amount of time is required, and real time processing is impossible.

An example of this is the detection of movement vectors, which is one the important operations in the processing of moving images. That is to say, in this operation, with respect to the images in two frames which are continuous in time, the amount of motion in the image of the object photographed is determined. In this operation, the image may be moved by I 8 pixels vertically or horizontally, and the amount of dislocation may be determined by overlaying the images until they line up. In other words, the amount of dislocation in the image between the two frames is calculated with respect to a total of 64 combinations, and the combination having the smallest amount of dislocation is found. Total calculations of a few tens of GOPS are required, and even if extremely high speed processors are employed on a number of chips in parallel, a period of approximately 30 msec is required. In order to control robots in real time, it is important to conduct the image data processing in 1 msec or less; however, this is completely impossible with current technology.

The present invention was designed in light of the above circumstances; it has as an object thereof to provide a semiconductor operational circuit which is capable of instantaneously processing in parallel a large quantity of information.

SUMMARY OF THE INVENTION

The semiconductor operational circuit of the present invention which executes a predetermined operation with respect to a first signal train of signals $A_1, A_2, \ldots, A_{N-1}, A_N$ (where N is a positive integer) of N signals numbered from 1 to N, and a second signal train of signals $B_1, B_2, \ldots, B_{M-1}, B_M$ (where M is a positive integer) of M signals numbered from 1 to M, comprising a plurality of first operational circuits for executing a predetermined operation with respect to $A_i$ and $B_{i+n}$, (where i is a positive integer and n is a positive or negative integer and $1 \leqq i \leqq n$ and $1 \leqq i+n \leqq M$) and generating an output signal $C_{i,n}$, at least one second operational circuit for generating the sum $S_n$ of a part or the whole of output signals of the first operational circuits with respect to a predetermined value of n, where i has differing values, or for generating a predetermined signal $T_n$ determined by the sum $S_n$, and a third operational circuit for finding the value of $S_n$ or $T_n$ with respect to a plurality of different n values and for determining the n value for which the maximum or minimum value of $S_n$ or $T_n$ is given.

By means of the present invention, it becomes possible to conduct operations with respect to an enormous amount of analog data gathered from the outside world without altering these data, and by means of this, to determine logic, and as a result, it is possible to realize extremely high speed data processing employing simple operational circuitry.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Description of the References

The following is a list of reference numbers utilized throughout the application:

| | |
|---|---|
| 101 | image sensor array, |
| 102, 103 | images of an aircraft captured as time t and t + Δt, |
| 102' | data projected along the x axis relating to image 102, |
| 103' | data projected along the x axis relating to image 103, |
| 102" | data projected along the y axis relating to image 102, |
| 103" | data projected along the y axis relating to image 103, |
| 104 | Δx detection circuit, |
| 105 | projection data memory, |
| 106 | correlation operational unit, |
| 107 | amount of movement detector, |
| 108 | Δy detection circuit, |
| 201, 202 | memories, |
| 203 | correlation operational unit, |
| 203a, 203b | correlation operational circuit cell, |
| 303, 304 | capacitors, |
| 305 | floating electrode, |
| 306, 307 | depletion type NMOS and PMOS, |
| 309 | source follower circuit having a CMOS structure, |
| 401 | winner-take-all circuit (WTA), |
| 402 | input signal, |
| 403 | address encoder, |
| 501 | circuitry, |
| 502 | CMOS inverter, |
| 503 | common floating gate, |
| 504 | 9-input NAND circuit, |
| 505 | output, |
| 601, 602 | NMOS switches, |
| 603, 604 | NMOS transistors, |
| 603a, 604a | floating gate electrodes, |
| 605a–d | switches of the input part, |
| 606, 607 | switches, |
| 801 | A data series memory storing t + Δt data, |
| 802 | B data series memory storing t data, |
| 803a, 803b | correlation operational circuit cells, |
| 804, 805 | wirings, |
| 806 | source follower circuit, |
| 807 | floating gate, |
| 808 | WTA, |
| 903, 904 | PMOS, |
| 903a, 904a | floating gates, |
| 905, 906 | terminals, |
| 1401 | image sensor array, |
| 1402 | Δx detection circuit, |
| 1403 | circuit block, |
| 1404 | memory storing t − Δt data, |
| 1405 | t data memory, |
| 1406 | t + Δt data memory, |
| 1407 | absolute value operational circuit, |
| 1601 | memory storing A data, |
| 1602 | memory storing B data, |

-continued

| | |
|---|---|
| 1603 | circuit group similar to 203, |
| 1701, 1702 | dummy capacitors, |
| 1703 | floating gate, |
| 1704, 1705 | switches, |
| 1706–1711 | cells, |
| 1801–1806 | cells, |
| 1807,1808 | switches, |
| 1809 | source follower, |
| 1810 | floating gate, |
| 1811, 1812 | capacitors, |
| 2001 | A data series memory, |
| 2002 | B data series memory, |
| 2003 | analog data shift register, |
| 2004 | operational circuit, |
| 2005 | source follower circuit, |
| 2006 | floating gate. |

Hereinbelow, embodiments of the present invention will be explained using the figures.

First Embodiment

Figure 1A:
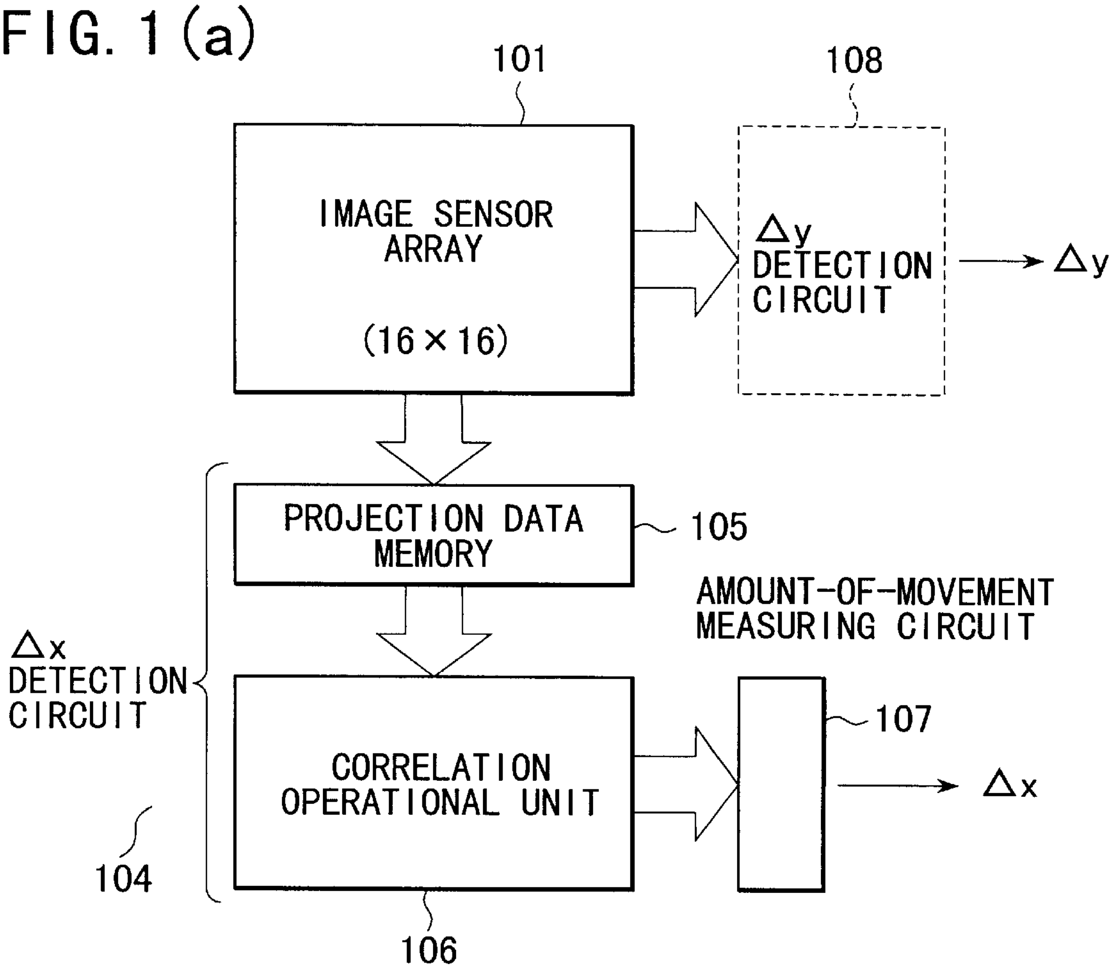
FIG. 1(*a*) and FIG. 1(*b*) are schematic diagrams explaining a first embodiment of the present invention.
Figure 1B:
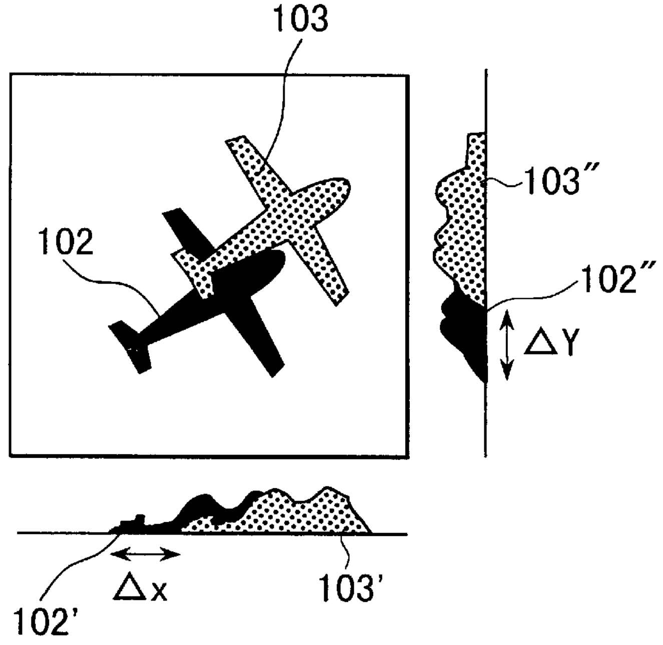

Figure 1(*a*) shows a first embodiment of the present invention as a block diagram; this is an operational circuit which detects motion vectors of images captured by an image sensor array 101. First, the function of this circuit will be explained briefly using FIG. 1(*b*). References 102 and 103 indicate images of an airplane captured at times t and t+Δt, respectively. Reference 102' indicates data in which data of each pixel in image 102 (indicating the brightness of each pixel) is totaled with respect to vertical columns and this is plotted along the x axis; these data thus represent a so-called projection of image 102 onto the x axis. Reference 103' indicates the x axis projection data of image 103, and 102" and 103" indicate y axis projection data relating to images 102 and 103. The circuit of FIG. 1(*a*) determines the amount of movement Δx in the x direction of the aircraft by detecting the displacement in the x axis projection data, and determines the amount of movement Δy in the y direction from the amount of displacement in the y axis projection data, and by means of this detects a movement vector (Δx, Δy).

In FIG. 1(*a*), reference 101 indicates a sensor array; here, in order to keep the explanation simple, an 16×16 sensor array (a total of 256 cells) was used as an example, but it is of course the case that any number of cells may be employed. First, the explanation will center on Δx detection circuit 104. Reference 105 indicates a analog memory which stores sixteen data points projected on the x axis, for each column of the sensor array, and two groups of values are maintained; the values for time t, and the values for time t+Δt. Reference 106 indicates a circuit which obtains the correlation between the two groups of data series. That is to say, the two groups of data series described above are shifted one pixel at a time in the horizontal direction, and the amount of displacement is calculated; in this embodiment, the amount of displacement when a shift of a maximum of four pixels is carried out is determined by means of simultaneous parallel operations. This output is inputted into amount of movement amount detector 107, and the amount of shift which results in the minimum evaluated amount of displacement is determined, and by means of this, the circuit specifies the amount of movement Δx. Δy detection circuit 108 is similar to the Δx detection circuit, and this circuit specifies the amount of movement Δy.

Figure 2A:
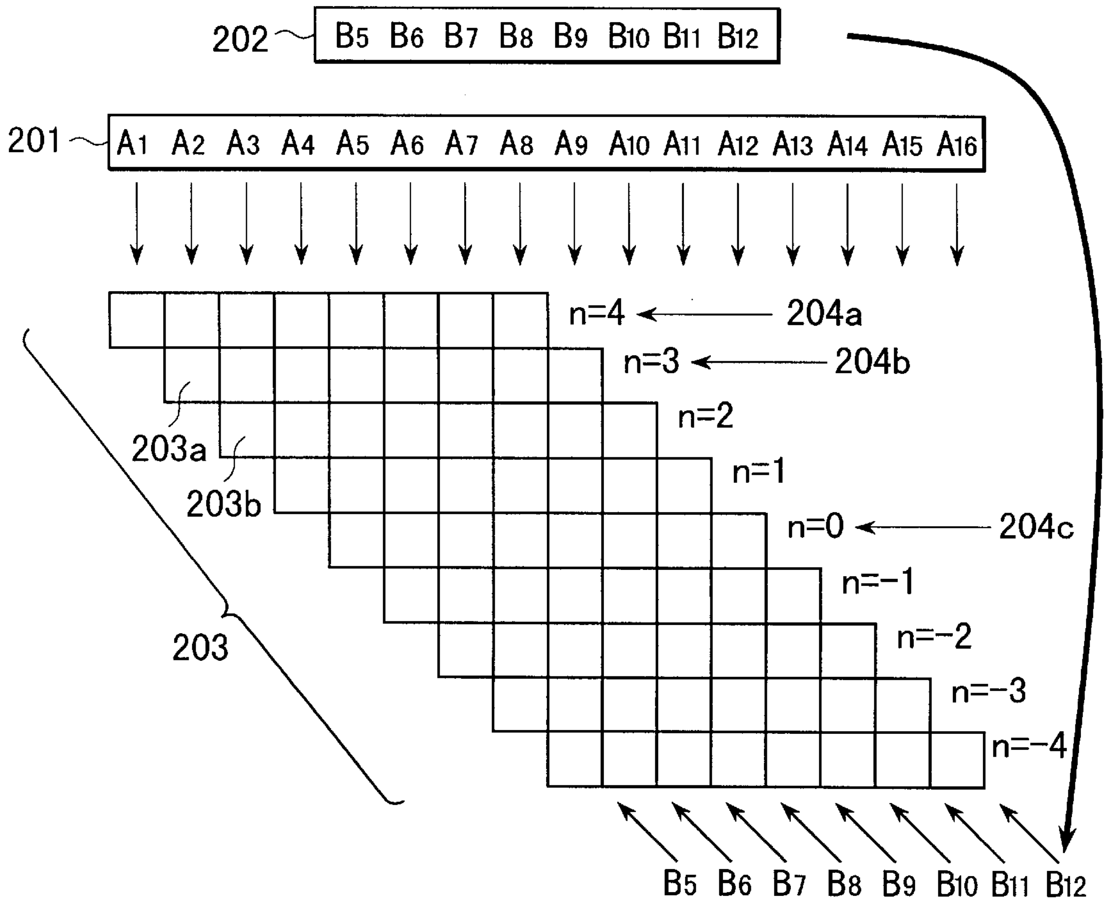
FIG. 2(*a*) and FIG. 2(*b*) are schematic diagrams explaining the function of the ΔX detection circuitry of FIG. 1.
Figure 2B:
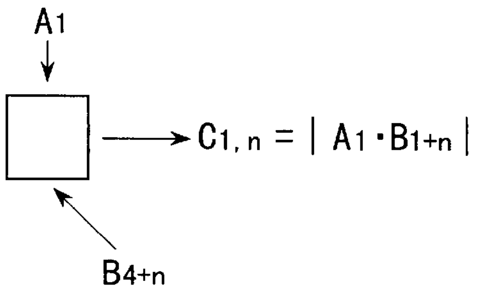

Next, the structures of the portions marked 105 and 106 are shown in greater detail in FIG. 2(*a*). First, the X axis projection data trains obtained at time t is $A_1, A_2, \ldots, A_{16}$, and memory 201 stores this temporarily. For example, $A_1$ is stored as a voltage value proportional to the sum of all the sensor outputs of the first column of image sensor array 101.

$B_5$, $B_6$, . . . , $B_{12}$ represents a x axis projection data trains obtained at time t+Δt; the fifth to the twelfth data is stored in memory 202.

Reference 203 represents a correlation operational unit; this comprises 72 correlation operational circuit cells 203*a*, 203*b*, . . . having the same function, which are arranged in two dimensions as shown in the figure. As is shown in FIG. 2(*b*), the function of each cell is such that the circuit calculates the absolute value $C_{i,n}=|A_i-B_{i+n}|$ with respect to the data $A_i$ supplied from memory 201 and the data Bi+n supplied from memory 202, and outputs the results.

The same data are supplied from memory 201 in the direction shown by the arrows in the figure. That is to say, the data $A_1$, $A_2$, . . . , $A_8$ are supplied to row 204*a*, the data $A_2$, $A_3$, . . . , $A_9$ are supplied to row 204*b*, and the data $A_5$, $A_6$, . . . , $A_{12}$ are supplied to row 204*c*.

The same data are supplied from memory 202 in the direction shown in the figure by the arrows. The eight data $B_5$, $B_6$, $B_7$, . . . , $B_{12}$ are supplied to each row, in other words.

Accordingly, the data $A_2$–$A_9$ from memory 201, and the data $B_5$–$B_{12}$ from memory 202, are supplied to the cells of row 204*b*, so that $|A_2-B_5|$ is calculated in cell 203*a*, and $|A_3-B_6|$ is calculated in cell 203*b*, for example. In other words, in this row, calculations are conducted in which n=3 and the B data are shifted to the left by 3 pixels with respect to the A data, and the absolute value of the difference therebetween is obtained. In row 204*c*, the calculations $|A_5-B_5|$, $|A_6-B_6|$, . . . , $|A_{12}-B_{12}|$, respectively, are carried out, so that n=0, and the amount of displacement when a comparison is carried out without shifting the data is determined. A circuit which sums all these absolute values or which finds, for example, $S_0=|A_5-B_5|+|A_6-B_6|+ \ldots +|A_{12}-B_{12}|$, is provided with respect to each of the rows in correlation operational unit 203. This structure is formed by, for example, the circuitry shown in FIG. 3. This example concerns the case of row 204*c*, and each cell 301, 302, and the like are circuits identical to those in FIG. 2(*b*); the respective output voltages $C_{5,0}$, $C_{6,0}$ are coupled with an electrically floating electrode 305 via capacitors (having a capacitance $C_s$) 303 and 304. References 306 and 307 indicate, respectively, depletion type NMOS and PMOS transistors, and these form a source follower circuit 309 having a CMOS structure. This is an amp in which the voltage gain when $V_{OUT}=V_{FG}$ ($V_{FG}$: potential of floating gate 305) is approximately 1. Reference 308 shows the floating capacitance $C_o$.

Since $V_{FG}=C_S\,(C_{5,0}+C_{6,0}+C_{7,0}, + \ldots +C_{12,0})/(8C_S+C_0)$, a voltage proportional to the sum So of the amount of displacement determined in each cell is outputted to $V_{OUT}$.

Similar calculations are carried out in each row 204*a*, 204*b*, and the like, and output voltages proportional to the sums $S_4$, $S_3$, and the like of the amount of displacement from each row are outputted simultaneously. These 9 data are inputted into motion amount detector 107. The details of this portion are shown in FIG. 4.

Figure 4:
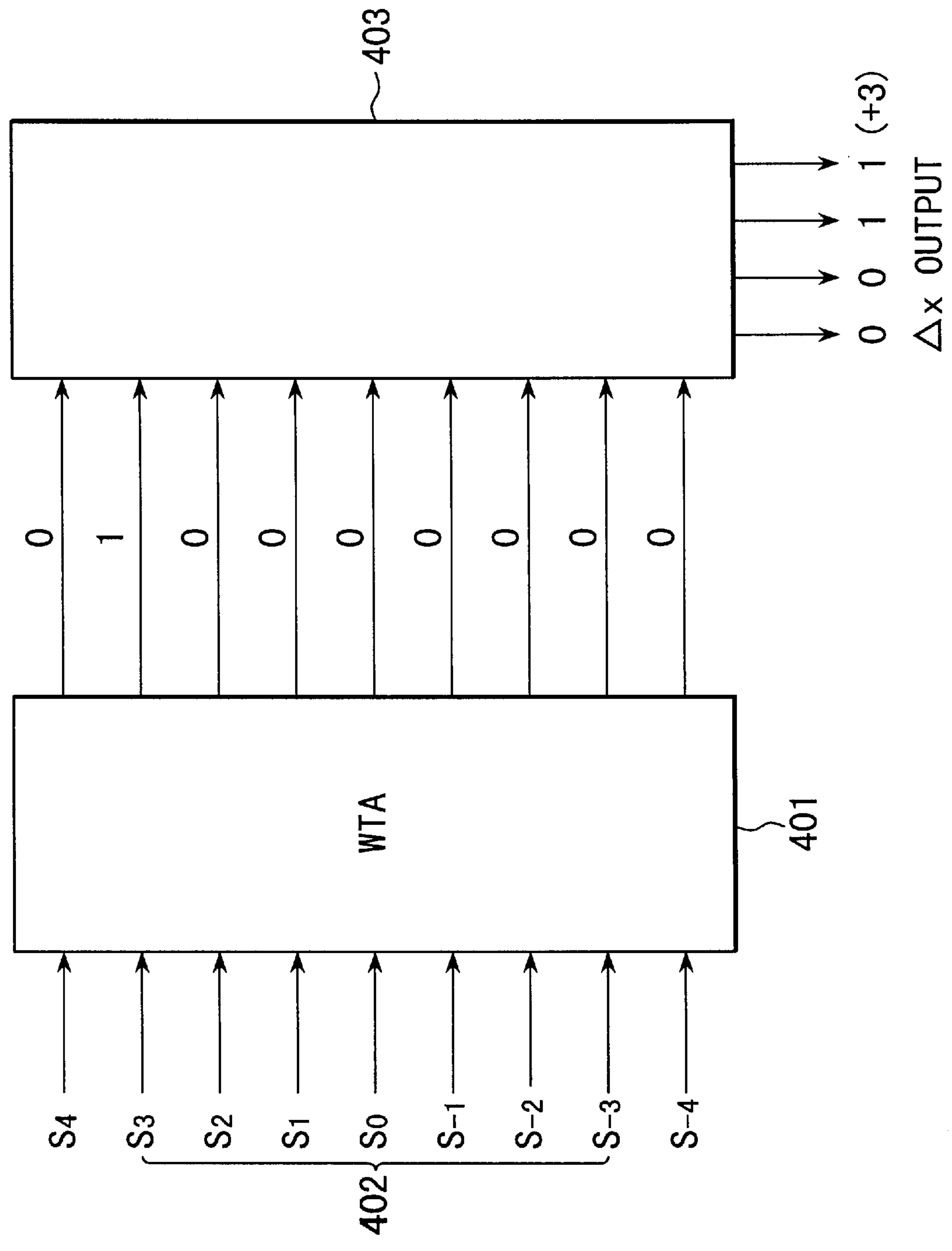
FIG. 4 is a schematic diagram showing an amount of motion detector.

In FIG. 4, Sn (where n=4, 3, 2, 1, 0, −1, −2, −3, and −4) shows the output voltages from each row of correlation operational unit 203; these form the 9 input voltages 402 into winner-take-all circuit (WTA) 401. In this embodiment, the function of the WTA is such that the circuit outputs a value of 1 only to the output terminal corresponding to the smallest input, while the value is outputted to all other output terminals; FIG. 4 shows the case in which $S_3$ has the smallest value among the 9 input signals. That is to say, only the output of the WTA corresponding to $S_3$ has a value of 1. This is inputted into address encoder 403, and a binary code corresponding to +3, for example, 0011, is outputted as the value of Δx.

Here, the lead 0 indicates "+", while the following 3 bits indicate "3".

A ROM with prescribed codes written thereinto may be employed as this address encoder, or alternatively, combined logical circuitry may be employed.

The fact $S_3$ has the smallest value indicates that the sum of the amounts of displacement in row 204*b* in FIG. 2(*a*) is the smallest. That is to say, when the t+Δt data are shifted 3 pixels to the left, this row has the best agreement with the t data; this corresponds to the case in which the movement of the image during the period of time Δt was 3 pixels to the right, so that in other words, Δx=3. In this way, it is possible to rapidly find the x component of the movement vector. In FIG. 1, the structure of the Δy detection circuitry is identical, and it is possible to rapidly find the value of y in the same manner.

Figure 5:
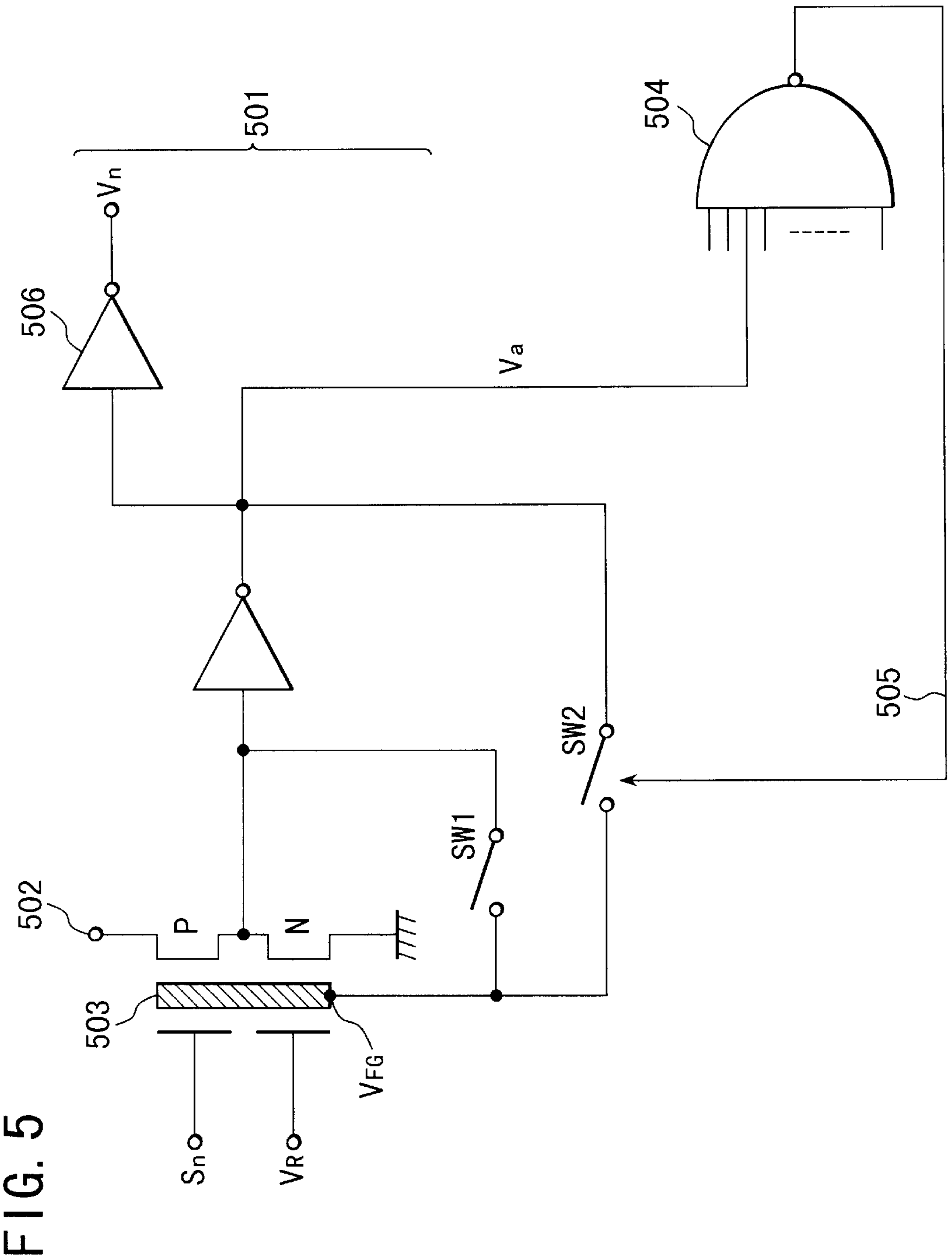
FIG. 5 is a circuit diagram showing an example of a winner-take-all (WTA) circuit.

Next, a concrete example of the circuitry of WTA 401 is shown in FIG. 5. $S_n$ and $V_n$ are, respectively, the input terminal and output terminal corresponding to the number n of WTA 401; circuitry identical to that of reference 501 is used with respect to each input. Reference 502 indicates a CMOS inverter; the common gate 503 thereof is placed in an electrically floating state by placing switches SW1 and SW2 in an OFF state. The 2 inputs $S_n$ and $V_R$ are capacitively coupled with floating gate 503 via capacitors having the same size.

Next, the operation of the circuit will be explained. First, in the state $S_n=0$ and $V_R=V_{DD}$, switch SW1 is closed. When this is done, CMOS inverter 502 is biased at the point at which the input and output characteristics change the most rapidly, and $V_{FG}$ becomes equal to $V_{DD}/2$. At this point in time, switch SW1 is placed in an OFF state, and the common gate 503 is placed in a floating state. Subsequently, when $V_{FG}$ becomes $V_{DD}/2$, CMOS inverter 502 enters an ON state, the output thereof drops to 0 V, and if $V_{FG}$ is less than $V_{DD}/2$, the inverter enters an OFF state, and the output thereof rises to $V_{DD}$. Next, the respective input voltages are inputted into $S_n$. Now, if $S_n$ is greater than 0, then $V_{FG}=(V_R+S_n)/2$ is given, and if $V_R=V_{DD}$, then $V_{FG}>V_{DD}/2$.

That is to say, CMOS inverter 502 is in an ON state with respect to all values of n, and $V_n=0$ and $V_a=V_{DD}$ results. Reference 504 indicates a 9 input NAND circuit; since the inputs thereof are all values of 1, the output 505 has a value of 0. By means of this, switch 5W2 is placed in an OFF state.

Next, when $V_r$ is ramped down from $V_{DD}$ to 0 V in the space, for example, of 200 nsec, when $V_{FG}$, $V_{DD}/2$, inverter 502 enters an OFF state, and $V_n=V_{DD}$ and $V_a=0$ results. There are a total of 9 circuits 501 provided for WTA 401; however, the first circuit to enter an OFF state is that circuit having the smallest value of $S_n$. NAND circuit 504 outputs a value of 1 if even one of the inputs thereof drops to a value of 0, and switch SW2 is in an ON state in all the circuits, so that the output voltage $V_a$ is fed back in each circuit to the floating gate, and thereby values are latched in an unchanged manner. That is to say, in the circuit having the smallest input, $V_n=1$ ($V_a=0$) results, and in the other circuitry, $V_n=0$ ($V_a=1$) results.

The WTA function is realized in the above manner. The circuitry of FIG. 5 represents only one example of a WTA, and it is of course the case that circuits having other forms may be employed.

Figure 3:
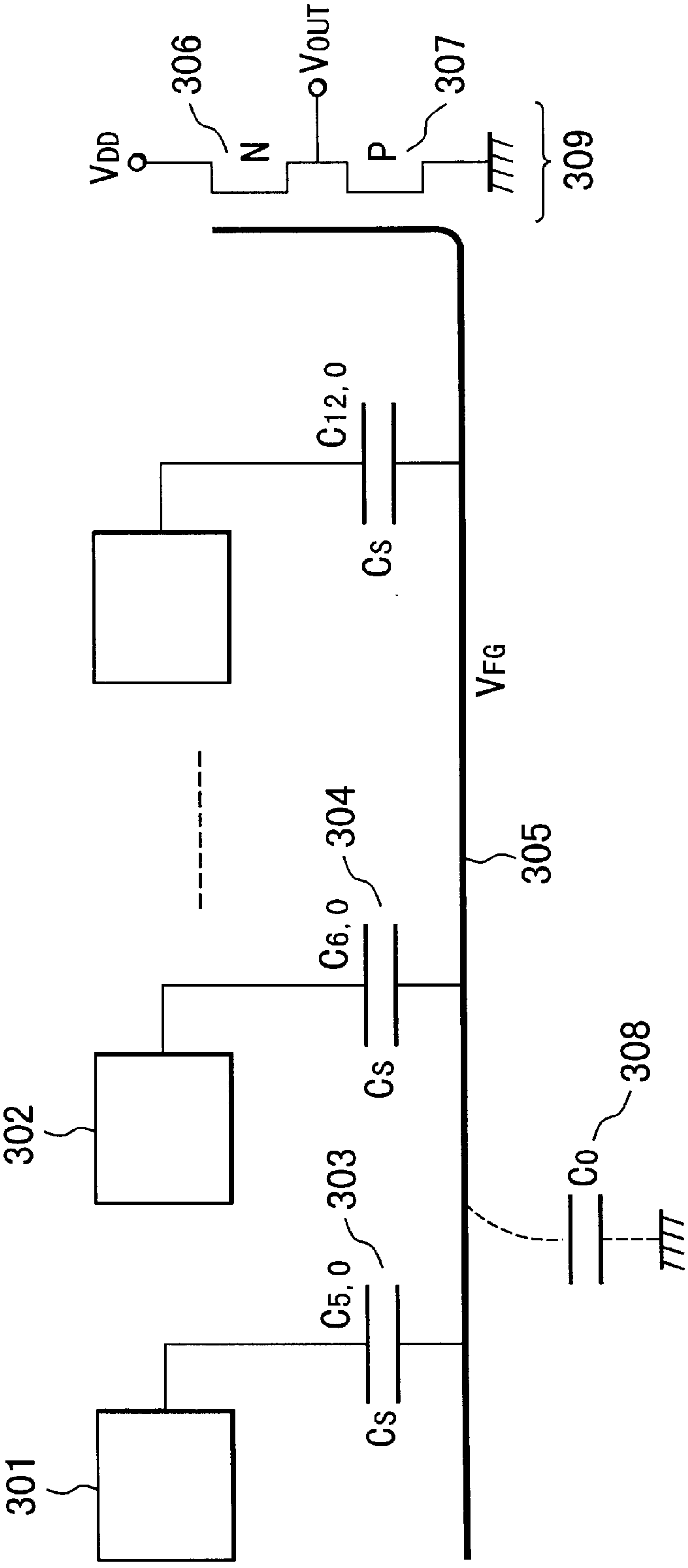
FIG. 3 is a schematic diagram showing the circuitry which calculates the sum of $C_{i,n}$.

In FIG. 3, the value of $S_n$ was outputted by a source follower circuit 309; however, this source follower 309 may be omitted. That is to say, floating gate 305 may be made identical to the floating gates 503 in FIG. 5. At this time, the $S_n$ input of FIG. 5 becomes unnecessary, and it is necessary that the size of the capacitor of the $V_R$ input be set equal to $8C_S$.

Figure 6B:
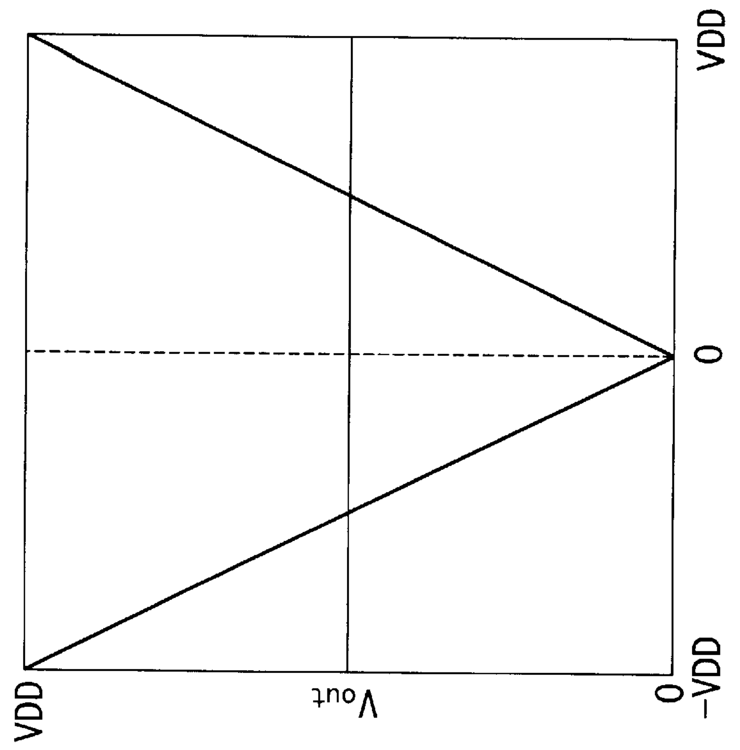
FIG. 6(*a*) shows an example of an absolute value operational circuit, while FIG. 6(*b*) shows the relationship between the input and output thereof.
Figure 6A:
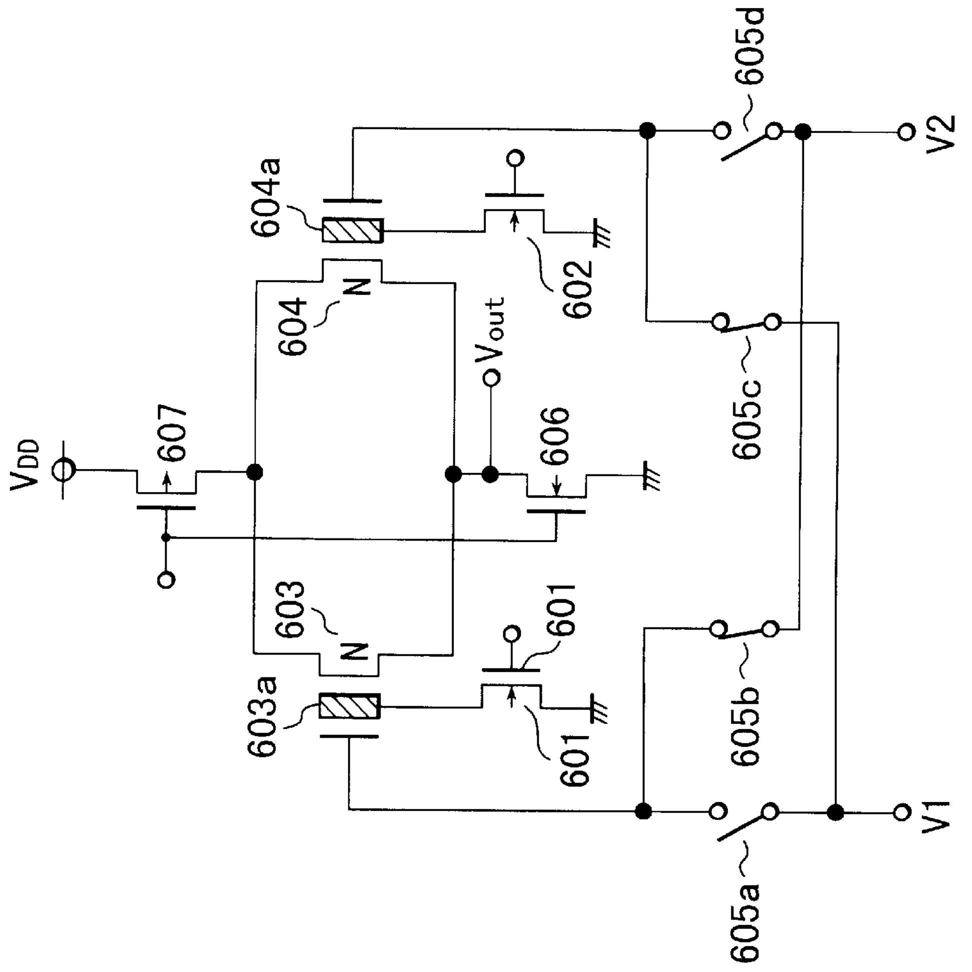

Next, a concrete example of the absolute value operational circuit of FIG. 2(*b*) is shown in FIG. 6. FIG. 6(*a*) is a circuit diagram, and $V_1$ and $V_2$ represent the two inputs thereof; these correspond to the input terminals for the A data and the B data.

Figures 7A, 7B, 7C, 7D:
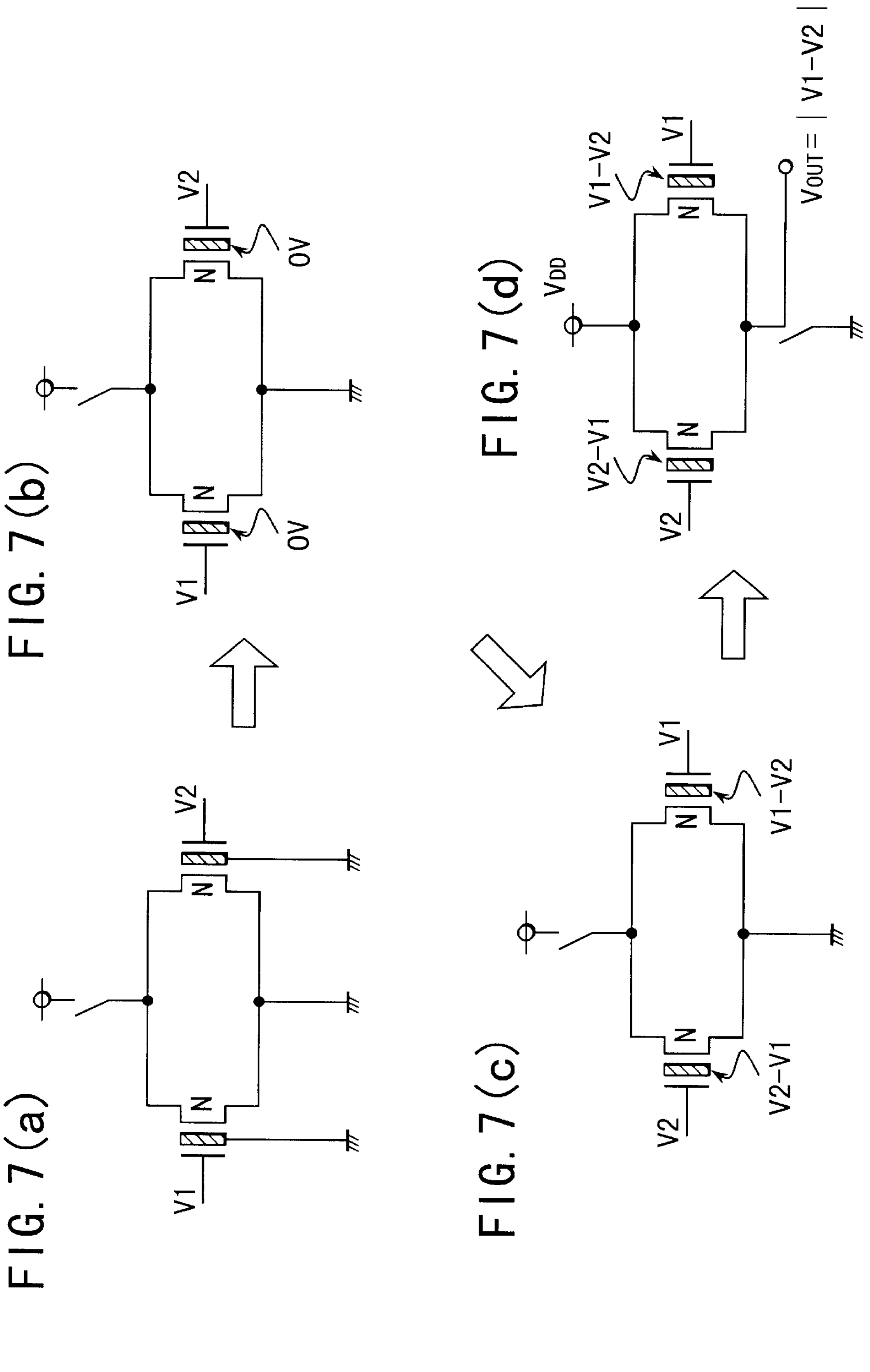
FIG. 7(*a*), FIG. 7(*b*), FIG. 7(*c*), and FIG. 7(*d*) illustrate the operation of the absolute value operational circuit.

FIG. 6(*b*) shows the relationship between $V_{out}$ and $V_1-V_2$; it can be seen that $V_{out}=|V_1-V_2|$. The operational principle of the present circuit will be explained using FIG. 7. First, the state of each switch in the state in which a prescribed input voltage is applied to $V_1$ and $V_2$ is as shown in FIG. 7(*a*). Next, NMOS switches 601 and 602 are placed in an OFF state, and the gate electrodes 603*a* and 604*a* of NMOS transistors 603 and 604 are placed in a floating state (FIG. 7(*b*)). Next, when the switches 605*a–d* of the input portion are switched and the input voltages are switched, the potential of floating gates 603 and 604 become equal to $V_2-V_1$ and $V_1-V_2$. If $V_1>V_2$, then $V_2-V_1<0$, and the potential thereof is fixed at the diffusion potential (approximately −0.7 V) by means of the drain PN junction of the NMOS transistor 601 (FIG. 7(*c*)).

Next, when switches 606 and 607 are switched, the output terminal $V_{OUT}$ is raised as shown in FIG. 7(*d*) by the supply of current from $V_{DD}$. If the threshold voltage of NNOS 603 and 604 is set to, for example, 0 V, then $V_{out}$ rises to a potential equal to the higher of the potential of floating gates 603*a* and 604*a*. That is to say, the circuit becomes one which outputs the maximum value. That is to say, $V_{out}$ becomes equal to $|V_1-V_2|$.

The circuit of FIG. 6 represents only one example; it is of course the case that any circuit may be employed insofar as it is a circuit which outputs a value proportional to $|V_1-V_2|$ or a value which increases monotonically with the value of $|V_1-V_2|$.

Second Embodiment

Figure 8:
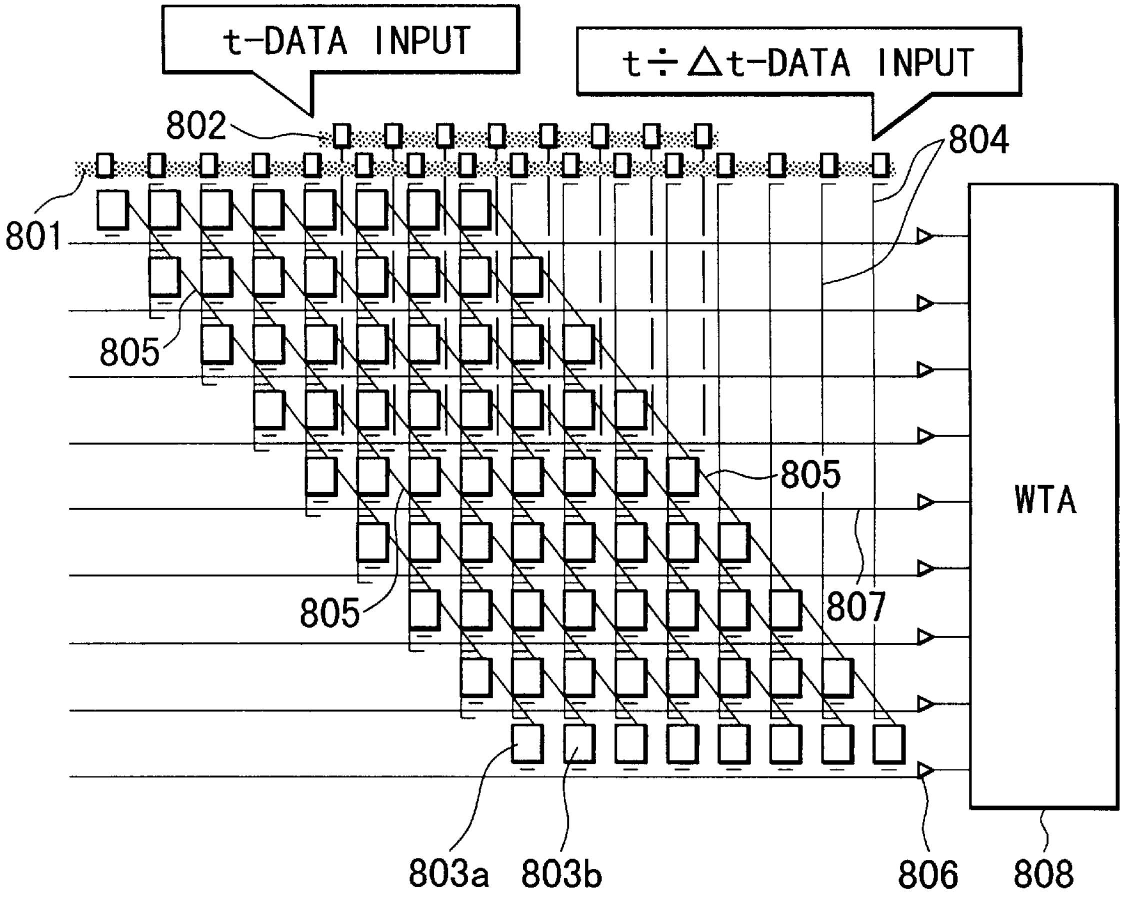
FIG. 8 is a schematic diagram illustrating a second embodiment of the present invention.

In the circuit of FIG. 2, a time t data series was inputted into 201, while a time t+Δt data series was inputted into 202; however, it is clear that no problems will be caused even if this is reversed. A second embodiment of the present invention, which has such a structure, is shown in FIG. 8.

Figure 9B:
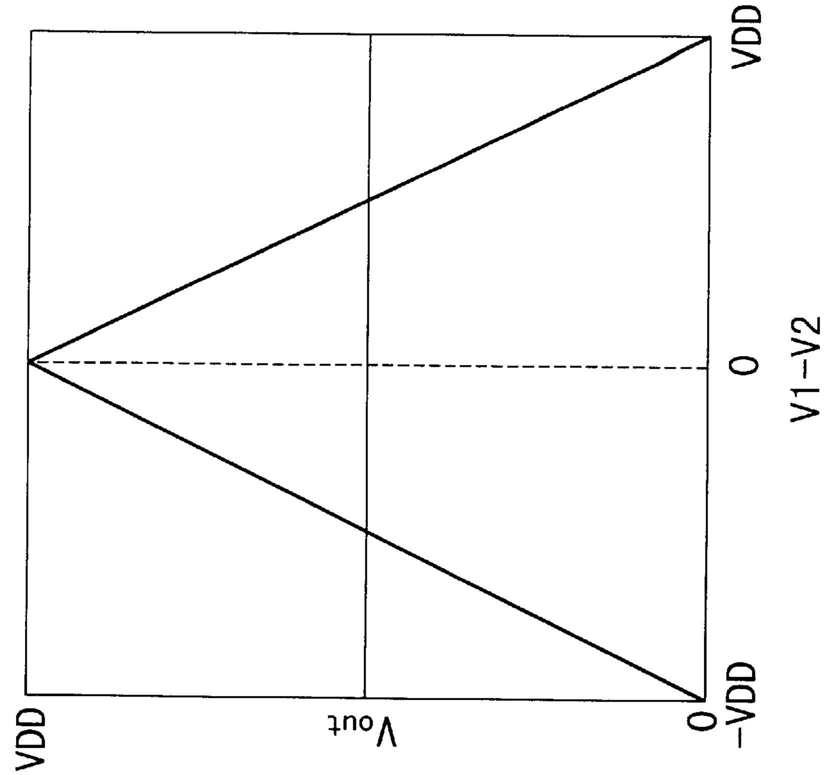
FIG. 9(*a*) shows another example of an absolute value operational circuit, while FIG. 9(*b*) shows the relationship between the input and output thereof.
Figure 9A:
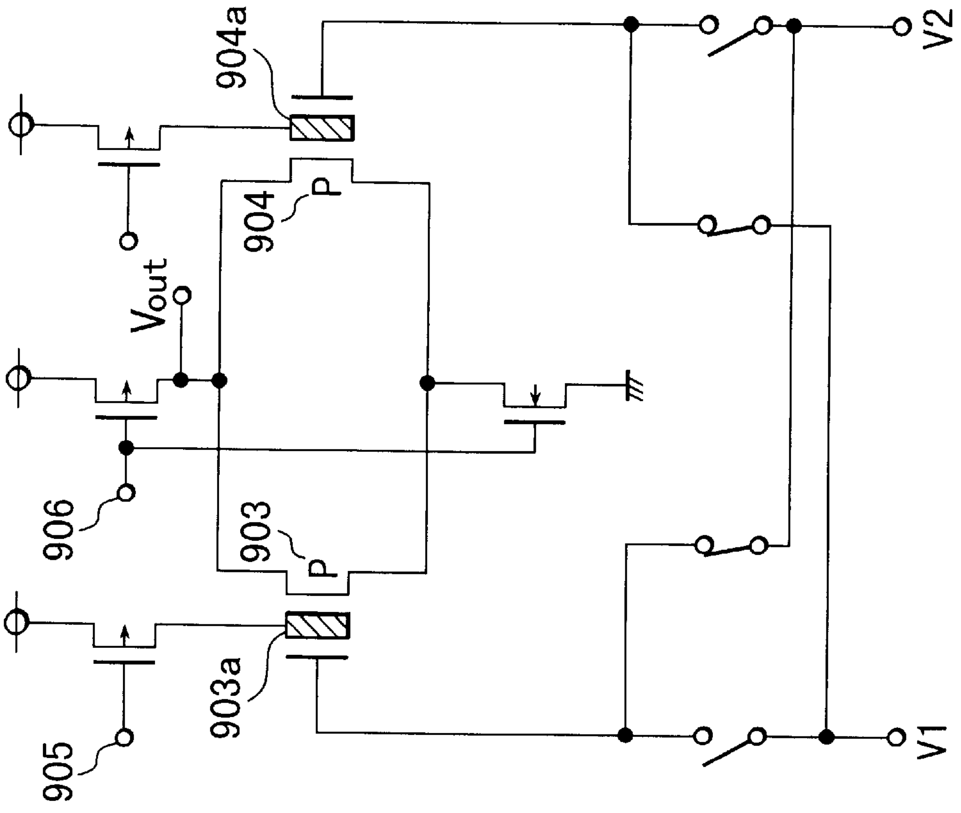

Reference 801 indicates an A data series storing the t+Δt data, while reference 802 indicates a B data series memory storing the t data. 803*a,* 803*b,* and the like are correlation operational circuit cells; in the present embodiment, these output a value of $C_{i,n}=V_{DD}-|A_i-B_{i+n}|$. A concrete circuit diagram is shown in FIG. 9. In FIG. 8, the wiring supplying the A data 801 and B data 802 to each cell is shown by, respectively, references 804 and 805 (the lines running in a diagonal direction). The basic structure is identical to that of FIG. 2, so that a detailed explanation thereof will be omitted here. Reference 806 corresponds to the source follower circuit 309, while reference 807 corresponds to the floating gate 305 thereof. Reference 808 indicates a WTA. In this case, the WTA circuit outputs a value of 1 only at the position of the input having the maximum value; concretely, a circuit such as that shown in, for example, FIG. 11, may be employed.

The circuit shown in FIG. 9(*a*) is a circuit which is almost identical in principle to that of FIG. 6(*a*); the chief differences thereof are that PMOS 903 and 904 are employed in place of NMOS 603 and 604, and the voltage becomes $V_{DD}$ when the gates 903*a* and 904*a* thereof are reset. FIG. 9(*b*), which shows the characteristics of the $V_{out}$ thereof, shows characteristics in which 0 and $V_{DD}$ are inputted in a reversed manner (characteristics such that the graph appears to be turned upside down) and the circuit outputs the largest value ($V_{DD}$) when $V_1$ and $V_2$ are in agreement, while when $V_1$ and $V_2$ are separated by the furthest amount, then the minimum value (0 V) is outputted. That is to say, as the data in each cell in FIG. 8 become closer, the score becomes higher, and the value of $S_n$ becomes larger.

Figure 10:
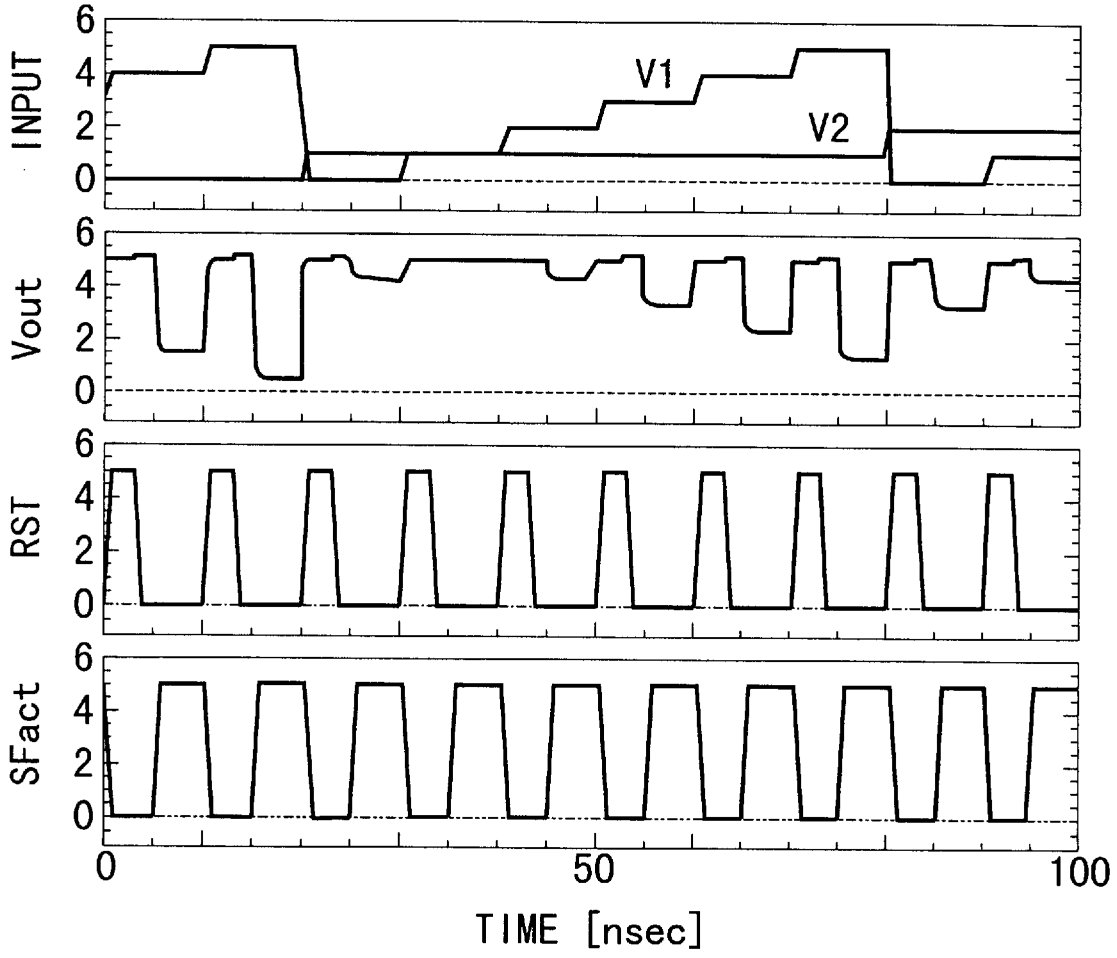
FIG. 10 is a graph showing the results of the operation of the absolute value operational circuit of FIG. 9.

FIG. 10 shows the results of a simulation of the operation of the circuit of FIG. 9 using a circuit simulator (HSPICE). In the figure, RST indicates the control signal applied to terminal 905, while SFact indicates the control signal applied to terminal 906; output is obtainable when both of these are at the low (0 V) value. It can be seen that the circuit operated as expected.

Figure 11:
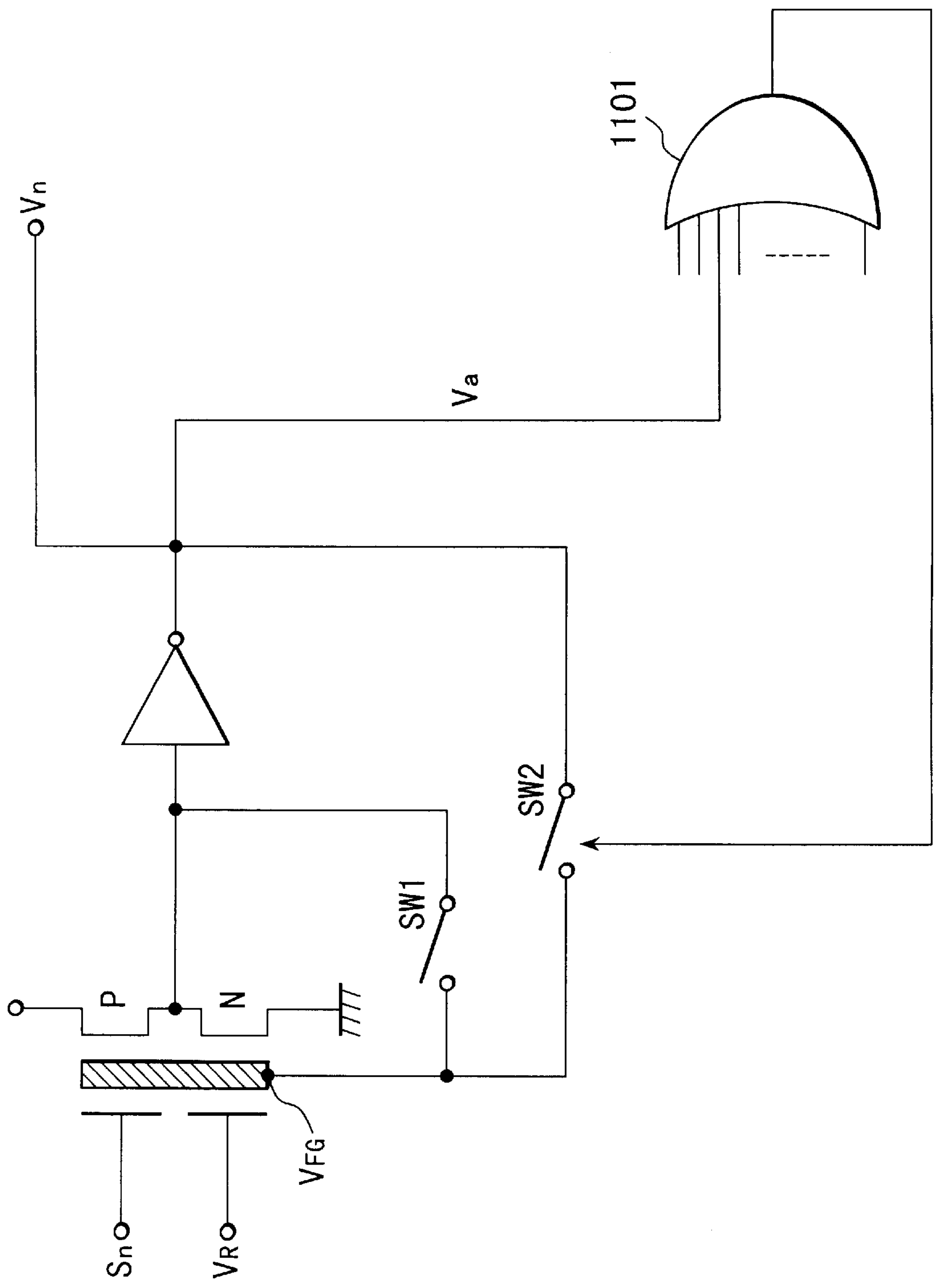
FIG. 11 is a circuit diagram showing another example of a winner-take-all (WTA) circuit.

The circuit of FIG. 11 is almost identical to that of FIG. 5. There are 3 differences: the output inverter 506 of FIG. 5 is removed, the NAND circuit is replaced by OR circuit 1101, and $V_R$ is initially set to 0 V, and is then ramped up from 0 to $V_{DD}$. $V_n$ has a value of '1'only when $S_n$ has the largest value in the circuit.

Figure 12:
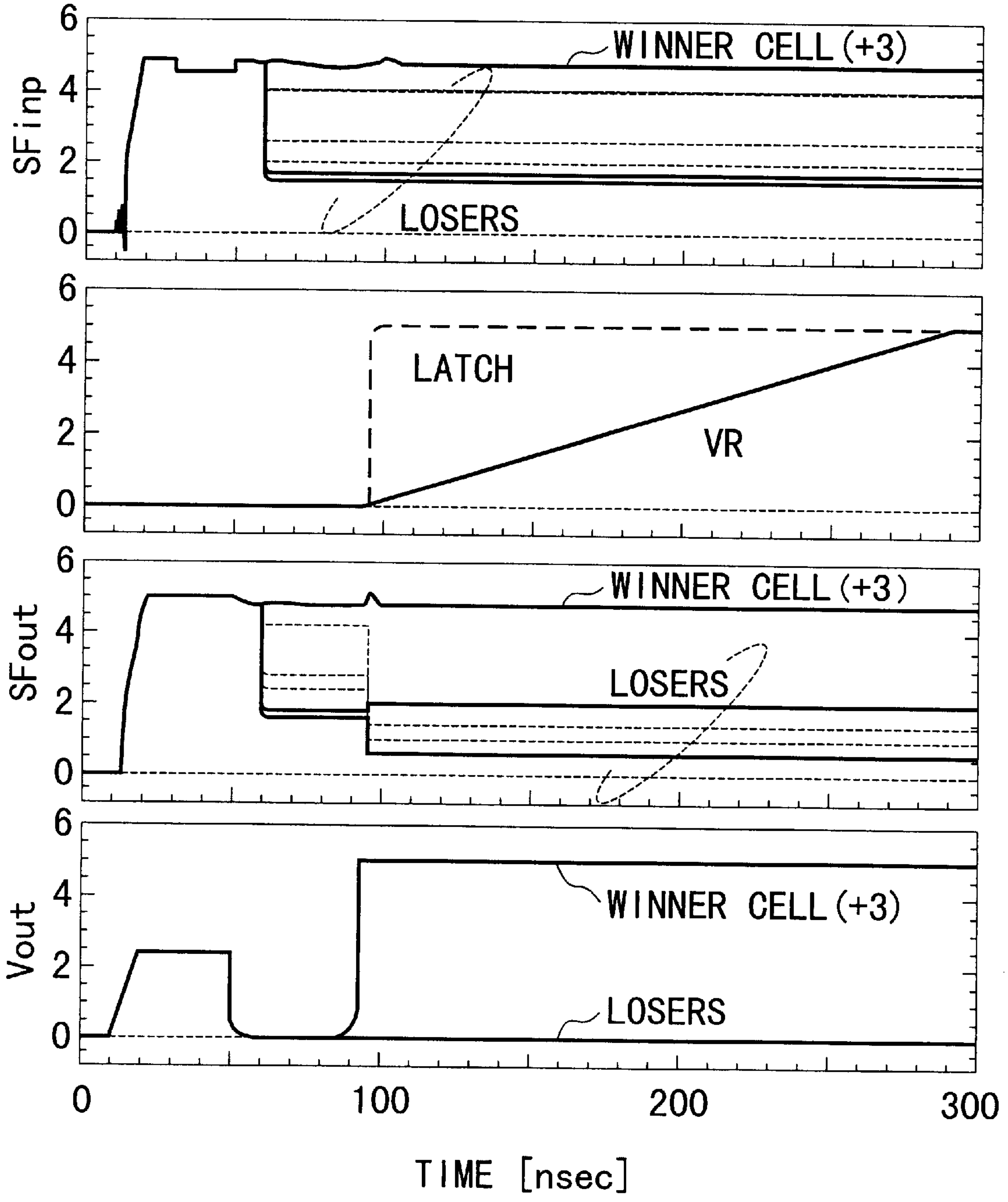
FIG. 12 is a graph showing the results of the operation of the circuitry of FIG. 8.
Figure 13:
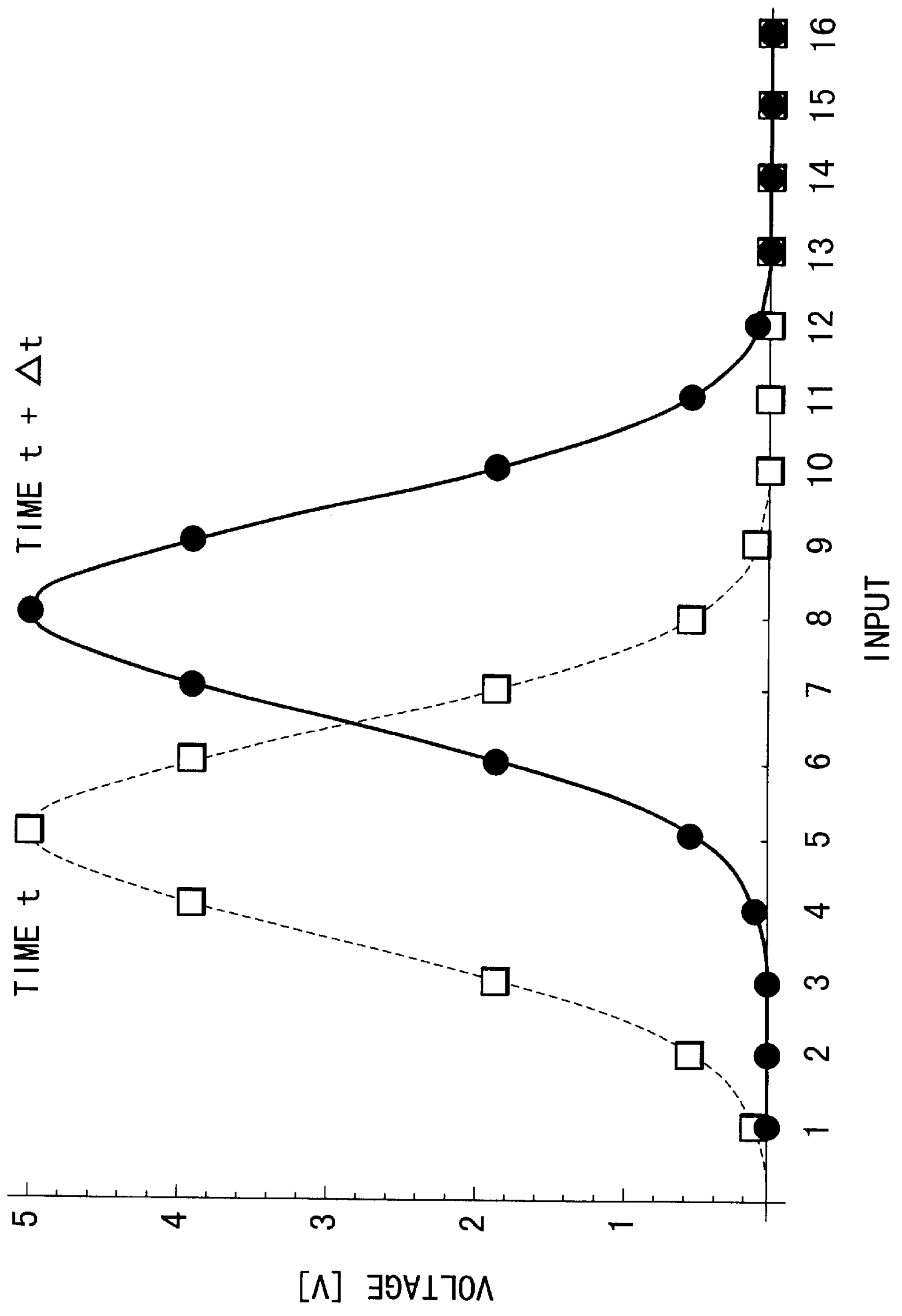
FIG. 13 is a graph showing the time t signal and the time t+Δt signal.

FIG. 12 shows the results of a simulation of the circuit of FIG. 8 using a circuit simulator (HSPICE). Here, as time t and t+Δt data, the Gaussian distribution signal shown in FIG. 13, in which a shift of +3 pixels to the right was carried out after Δt, was applied, and calculations were conducted. In FIG. 12, SFinp indicates the input voltage into source follower circuit 806 and the like, or in other words, the potential wave form of floating gate 807 and the like, while SFout indicates the output wave form of the source follower. $V_{out}$ indicates the output of WTA circuit 808; only the output of the terminal corresponding ton=+3 has a value of 5 V, while the other terminals all have a value of 0 V, and this indicates that Δx=+3 pixels.

As is clear from this figure, operations are concluded after 300 nsec no matter how long, and the movement vector can be selected. In comparison with the conventional digital method, in which it was extremely difficult to end operations within 30 msec, it can be seen that this represents an $10_5$-fold (a 100, 000-fold) increase in speed. Accordingly, the present invention is extremely effective in the real time processing of image data. Furthermore, because this invention can realized using simple circuitry such as that shown in FIG. 8, it can be integrated on the same chip as the image sensor, and applications such as the direct provision of intelligent functions in robot eyes and the like can be accomplished in an extremely simple manner.

In the first and second embodiments described above, movement vectors were found using data representing the direct addition, by row or by column, of two dimensional image sensor data; however, image processing such as edge detection or the like may conducted in advance with respect to the two dimensional image data, and after that, the data may be added by row or by column. There are cases in which this method improved the accuracy of detection. Furthermore, a method may be adopted in which one or other of these methods are appropriately selected, operations are conducted successively in which results are determined using both cases with the same hardware, and thus movement detection is conducted with higher accuracy. Furthermore, the result of the addition of 1 row or 1 column of pixel data corresponded to 1 datum; however, 2 or more rows, or two or more column of data may be added, and this may be made to correspond to 1 datum. This is effective in the case of image sensors having a large number of pixels. Furthermore, a correlation operational circuit was described which only conducted operations which obtained the absolute value; however, other operations may be employed. For example, an operation which determines the largest value of $A_i$ and $B_{i+n}$ may be conducted, and the amount of movement may be determined by the minimum value of the total of these maximum values for each cell. Furthermore, this may be reversed, and the minimum values of $A_i$ and $B_{i+n}$ may determined, and the amount of movement found by finding the maximum total of the minimum values for each cells. Furthermore, a so-called matching operation may be conducted in which the output is $V_{DD}$ only when $|A_i-B_{i+n}|<w$, and the output is 0 at other times. Furthermore, a matching operation may of course be conducted in which the output is 0 only when $|A_i-B_{i+n}|<w$ and the output is $V_{DD}$ at other times.

A further important point in the present invention is that it is not necessary that the t data be in perfect agreement with the t+Δt data with respect to the pixel shift. The shift resulting in the relatively closest fit is found, so that even if an object moves while the form thereof is changed slightly, the amount of movement can be found without problem.

Third Embodiment

Figure 14:
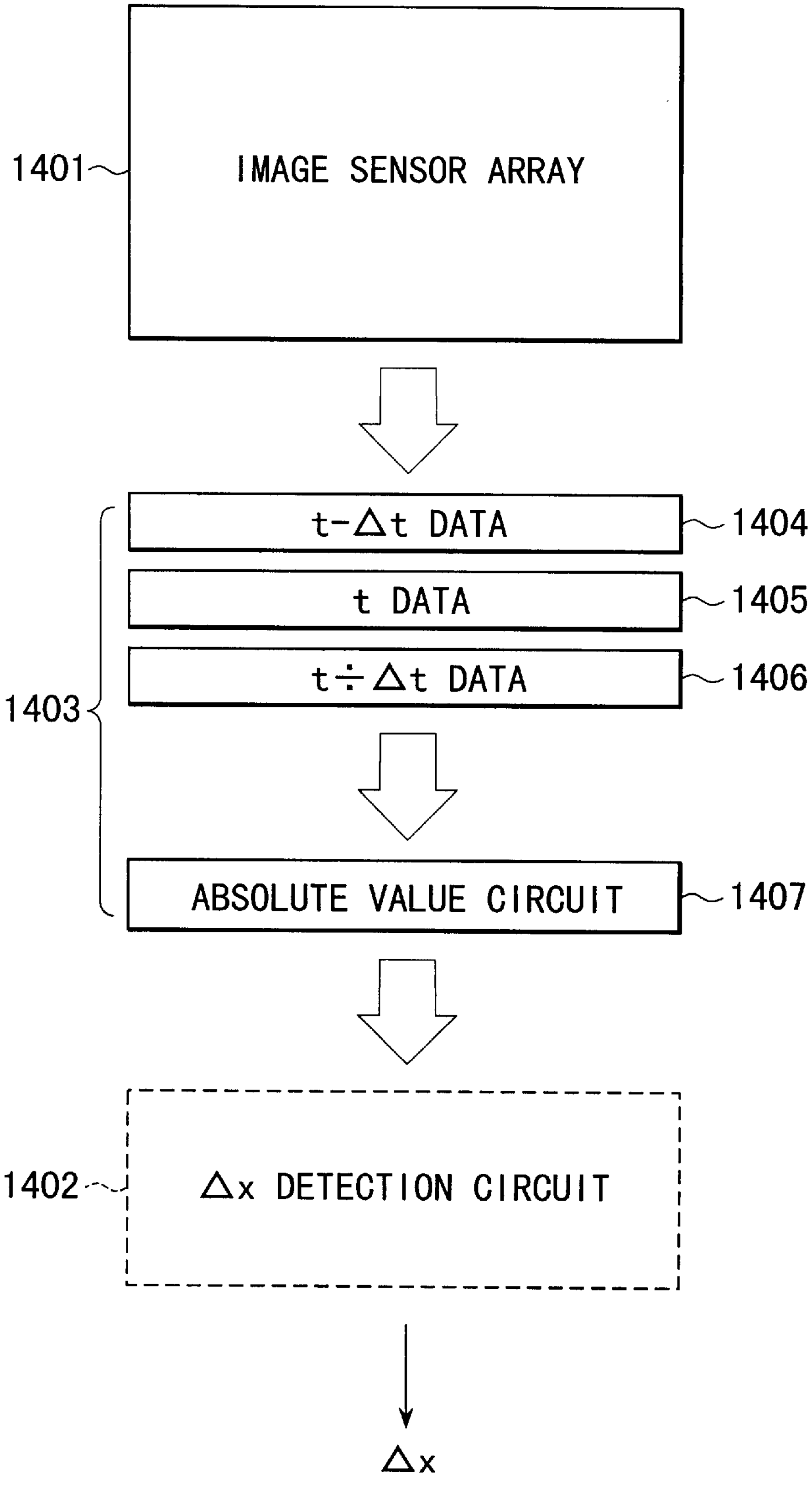
FIG. 14 is a schematic diagram illustrating a third embodiment of the present invention.
Figure 15A:
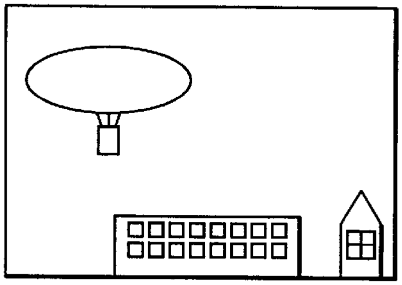
FIG. 15(*a*), FIG. 15(*b*), FIG. 15(*c*), FIG. 15(*d*), FIG. 15(*e*), and FIG. 15(*f*) are schematic diagrams illustrating the detection principle of the third embodiment.
Figure 15B:
Figure 15E:
Figure 15C:
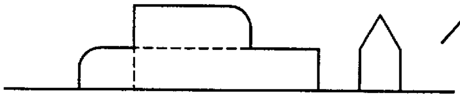
Figure 15F:
Figure 15D:
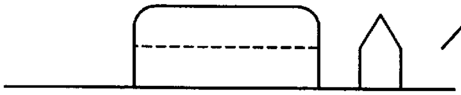

Next, a third embodiment of the present invention will be explained using FIG. 14. This is an operational circuit which accurately finds only the amount of movement of a moving object when the specified object is moving against a sLill background. Reference 1401 indicates an image sensor array, while reference 1402 indicates a Δx detection circuit; these are identical to those described in FIG. 1. In the present embodiment, a new circuit block 1403 is added.

References 1404–1406 indicate memories which store sum signals in the columnar direction of the image sensor, that is to say, the x axis projection data; these memories are used for the data of the 3 time frames such that memory 1404 stores the t−Δt data, memory 1405 stores the t data, and memory 1406 stores the t +Δt data. Reference 1407 indicates an absolute value operational circuit; this calculates the absolute value of the difference of the t−Δt data and the t data, and the absolute value of the difference between the t data and the t+Δt data, and provides these as the A data series and B data series to the Δx detection circuit. The circuit shown in FIG. 6 may be employed as this circuit.

By means of this, it is possible to specify the movement of the moving object against a still background with a high degree of accuracy. The principle thereof will be explained using FIG. 15.

FIG. 15(*a*) depicts a balloon moving over a building. Only the balloon moves, and it moves to the right. The x axis projection data of the data of (*a*) are as shown in FIG. 15(*b*), and the data after Δt are as shown in FIG. 15(*c*), and as the background is incorporated in these data, it is extremely difficult to determine the amount of movement using a pixel shift. When the absolute of the difference of both is obtained as in FIG. 15(*e*), the background is made stationary, so that this is canceled out and disappears. Next, when the difference between the t+Δt data (FIG. 15(*d*)) and the t data is obtained, this results in FIG. 15(*f*). If the data of FIG. 15(*e*) and FIG. 15(*f*) are then used as the time t' data and the t' +Δt data, it is possible to find the amount of movement Δx using a circuit 1402 identical to that of the first and second embodiments.

Fourth Embodiment

Figure 16:
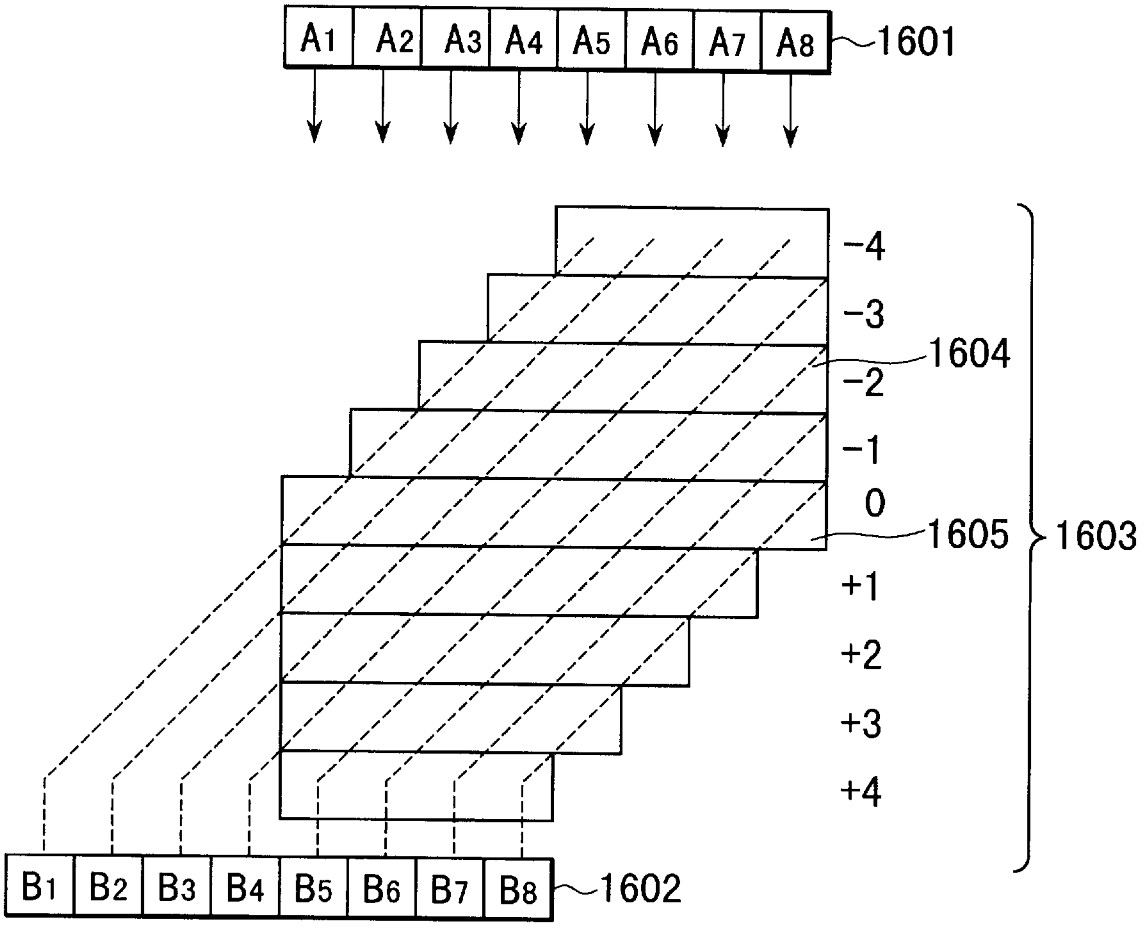
FIG. 16 is a schematic diagram illustrating a fourth embodiment of the present invention.

A fourth embodiment of the present invention is shown in FIG. 16. This circuit executes a SEARCH (N, M) command with respect to data series $A_1$–$A_8$ and $B_{1\ -B8}$ comprising 2 groups of 8 data. That is to say, the circuit takes a number of continuous data N from the position having the ordinal number N in the A data series, and determines at what position in the B data the best agreement is found. For example, in this embodiment, if N is the values from 4–6, then N takes a value within a range of 1–(8–M).

References 1601 and 1602 indicate memories storing, respectively, the A data and the B data, and reference 1603 indicates a circuit group identical to 203 in FIG. 2; each correlation operational circuit cell is identical to those in the first and second embodiment, and any type of circuit may be employed. The A data and the B data are supplied to each cell along the lines shown, respectively, by the arrows and the dotted lines.

To use an example, the sixth data on the right hand side $A_3$, $A_4$, $-A_8$ and the sixth data $B_1$, $B_2$, $-B_6$ are supplied to the row 1604.

Figure 17:
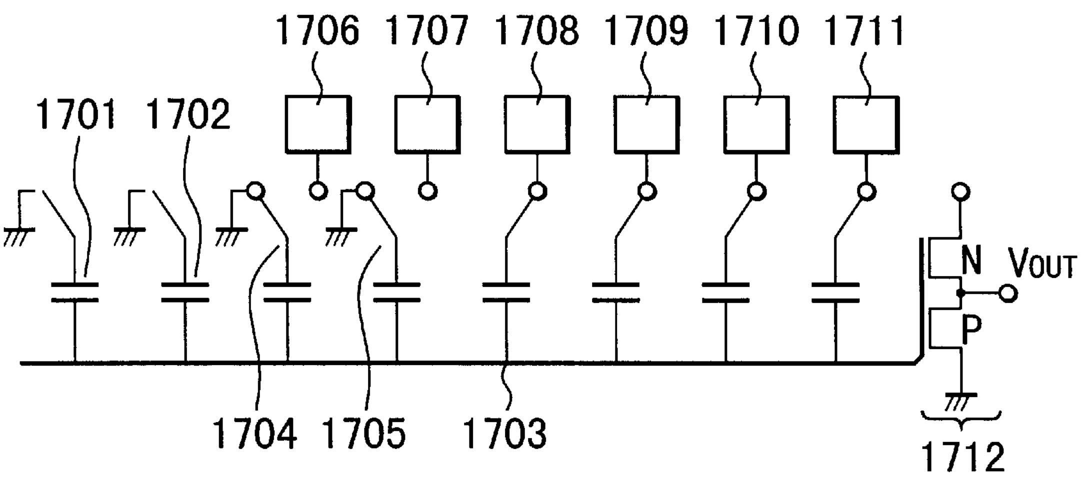
FIG. 17 is a schematic diagram showing an example of a method for setting the gain of each source follower to the same value.

The major point of difference with the case shown in FIG. 2 is that length of each row is different. As a result, in the circuitry shown in FIG. 3, the number of cells 301, 302, and the like connected to floating gate 305 differs for each row, and this interferes when a comparison is conducted between the sizes of the sums of the absolute values of the difference between differing rows. That is to say, it is necessary to provide a mechanism for setting the gain of each source follower to the same value. An example thereof is shown in FIG. 17.

This figure shows the structure related to the cells of row 1604 in FIG. 16. Since only 6 cells are incorporated in 1604, this row has 2 fewer cells than the largest row 1605, which has 8 cells. Accordingly, dummy capacitors 1701 and 1702 are added so that the total reaches 8, and the input terminal thereof fall to the ground potential. By means of this, it is possible to set the total capacity value as seen from the floating gate 1703 to the same value in all rows. Furthermore, the minimum value of N of the search (N, M) is 4, so that there are cases in which only 4 cells are employed. In this case, switches 1704 and 1705, for example, may be set to the ground side, and cells 1706 and 1707 may be cut off. The cells 1708–1711 which are necessary for the operation may have the cell outputs thereof connected to capacitors via switches, and the output thereof may be transmitted to floating gate 1703. By doing this, it is possible to conduct size comparisons with a constant value for the gain of the source follower circuit 1712.

Figure 18:
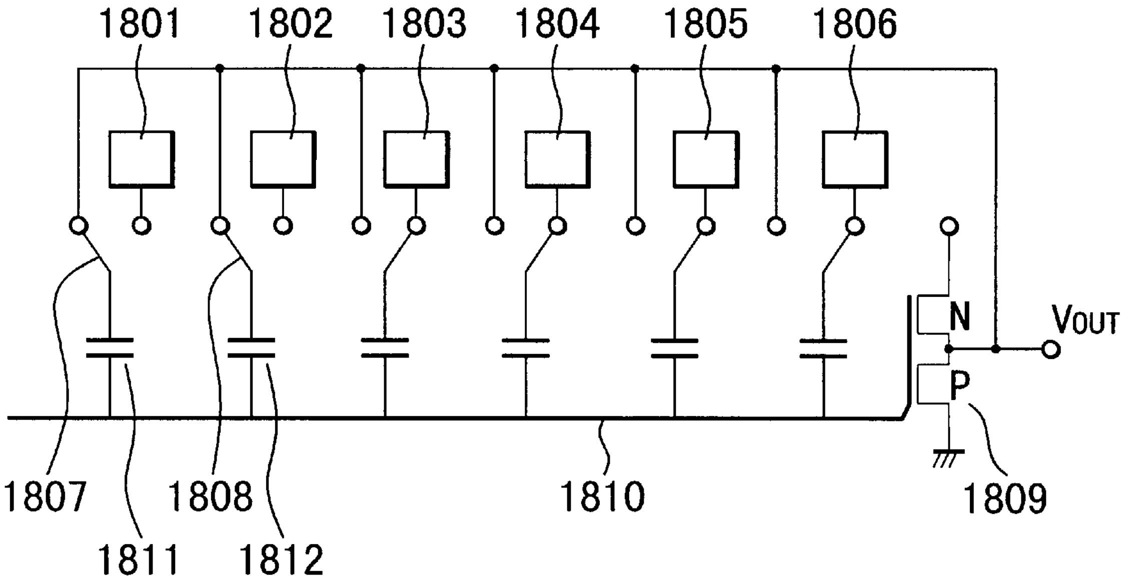
FIG. 18 is a schematic diagram illustrating a method for detaching unnecessary cells.

FIG. 18 illustrates a different invention for cutting off unnecessary cells. In this method, no dummy capacitors are employed. In order to cut off the 2 cells 1801 and 1802 from the six cells 1801–1806, the switches 1807 and 1808 are thrown to the left, and connected to the output of source follower 1809. The value of $V_{out}$ is essentially equal to the voltage $V_{FG}$ of floating gate 1810, 50 that no voltage is applied to the two sides of capacitors 1811 and 1812 and no charge builds up. This is the same as if capacitors 1811 and 1812 were not present, and this is essentially equivalent to cutting these capacitors off completely from the floating gate 1810. By the use of this method, the source follower operates constantly with the largest gain even if the number of cells is small, so that detection of the degree of movement can be conducted with a high degree of accuracy.

Figure 19A:
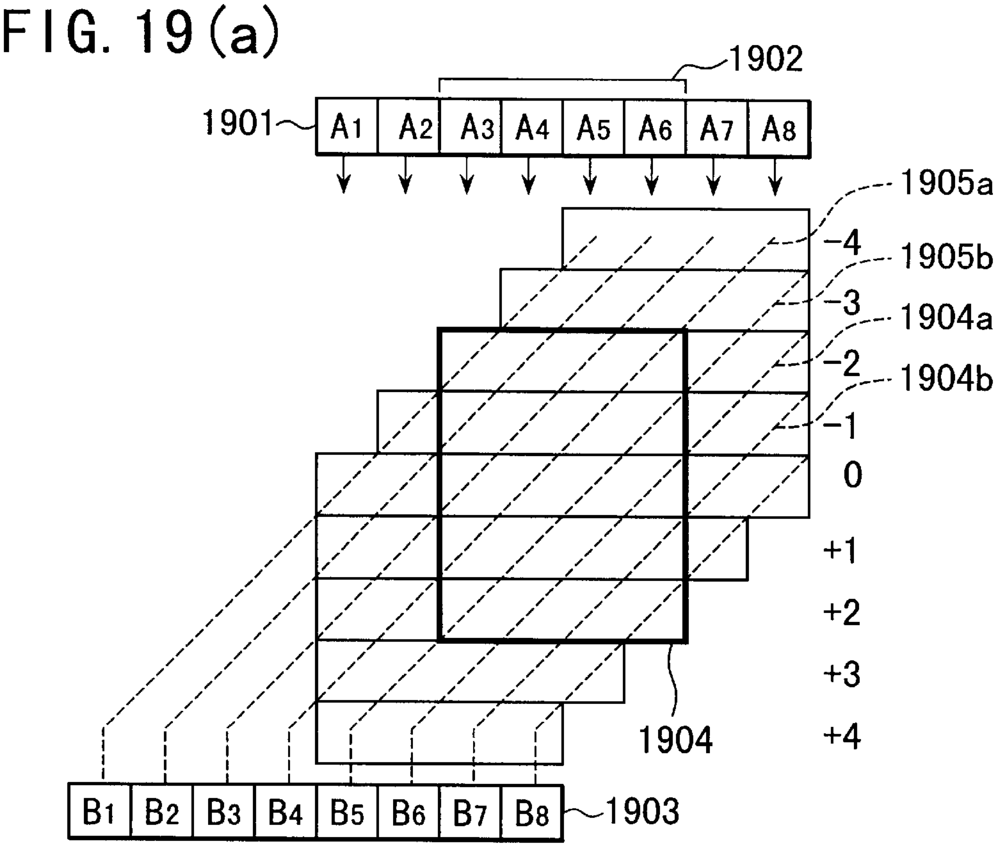
FIG. 19(*a*) and FIG. 19(*b*) illustrate the operation of the circuitry when SEARCH (N,M) is executed.
Figure 19B:
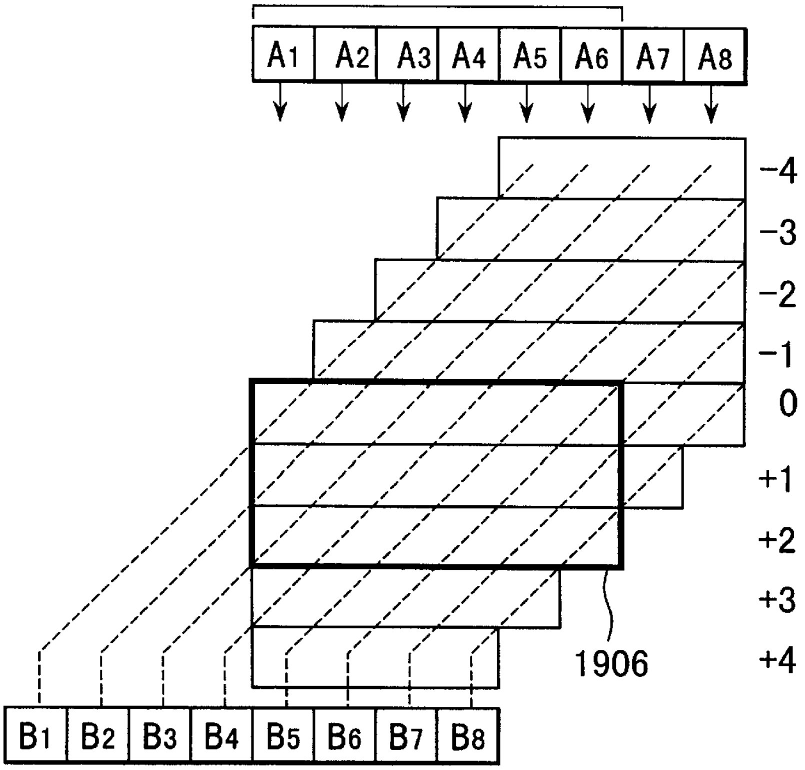

FIG. 19 shows an example of the operation of the circuitry when the SEARCH (N, N) command is actually executed. FIG. 19(*a*) shows, for example, SEARCH (3,4); the data $A_3$, $A_4$, $A_5$, and $A_6$ (1902) within the A data memory 1901 are compared with the B data 1903. At this time, only those correlation operational cells within the box indicated by the heavy line 1904 are employed, so that control must be conducted which ignores the output of the other cells.

Accordingly, in rows 1904*a,* 1904*b,* and the like, it is necessary to cut off unnecessary cells using the method shown in FIG. 17 and 18. Furthermore, in other rows, for example, in rows 1905*a,* 1905*b,* and the like, there is no need to input the operational results $S_{-4}$, $5_{-3}$, and the like into the WTA (for example, 401, 808, or the like), so that the input into the WTA may be fixed at a standard value of 0 V, $V_{DD}$, or the like. If the WTA determines the input having the smallest value as shown in FIG. 5, then the inputs may be set to VDD, while if the WTA determines the input having the largest value as in FIG. 11, these inputs may be set to 0 V. FIG. 19(*b*) shows the case of the command SEARCH (1, 6); the cells outside the box marked with the heavy line may be cut off using control identical to that described above.

In the fourth embodiment described above, the case was described in which operations were conducted in which the agreement between two groups of data series having 8 data was determined, in order to keep the explanation simple; however, this may be conducted with respect to data series containing a larger number of data. Furthermore, data series may be used as the two groups of data which are obtained from, for example, a 1 dimensional image sensor (an image sensor in which a plurality of pixels are arranged in a series).

Using a camera or the like, incident rays may be split in two directions using a micro lens, and these may be captured by different 1 dimensional image sensors, and operations may be conducted using the data thereof as the two groups of data series. By means of this, the dislocation and the focal point may be detected and tight adjustment of the photo lens may be conducted, and thereby, an autofocus function may be realized.

If autofocusing is conducted using the circuit of the present invention, high speed control is realizable using extremely simple circuitry.

Fifth Embodiment

Figure 20:
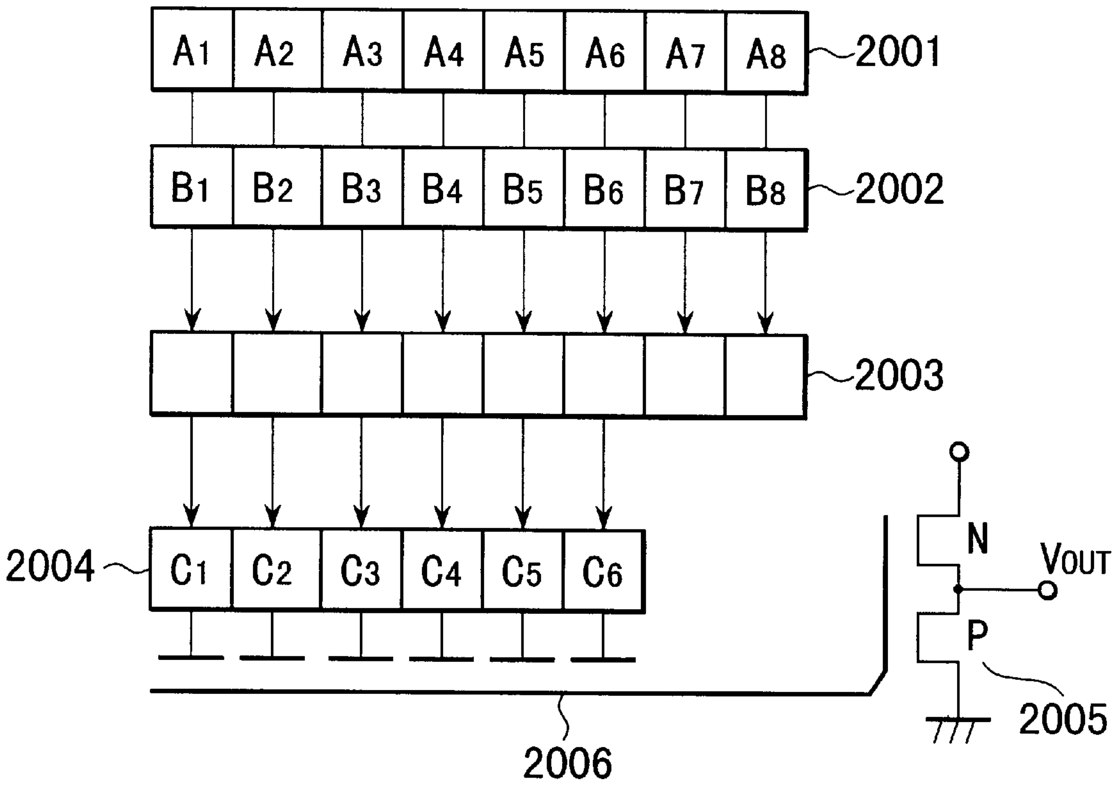
FIG. 20 is a schematic diagram illustrating a fifth embodiment of the present invention.

FIG. 20 shows a fifth embodiment of the present invention. The function of this embodiment is identical to that of the fourth embodiment; a SEARCH (N, M) command is executed with respect to two types of data series A and B. Reference 2001 indicates an A data series memory, while reference 2002 indicates a B data series memory. Reference 2003 indicates an analog data shift register; here, this has the function of shifting the data to the left one datum at a time.

Reference 2004 indicates 6 operational circuits arranged in a series, which have the same function as those of FIG. 2(*b*). The process of executing a SEARCH (3, 4) command will be explained hereinbelow.

First, the entire A data series of memory 2001 is transferred to shift register 2003, and these are shifted 3 places to the left, and stored in operational circuit 2004. Next, the B data series are entered into shift register 2003, and are then transferred to operational circuits 2004 without being shifted. In this way, the data $A_3$, $A_4$, $A_5$, $A_6$, $A_7$, $A_8$ and the data $B_1$, $B_2$, $B_3$, $B_4$, $B_5$, and $B_6$ are incorporated into the cells $C_1$, $C_2$, . . . , $C_6$ of the operational circuit, and if the operation $A|_i-B_{i+n}|$ (n=−2) is conducted, the output is transferred to floating gate 2006 of source follower circuit 2005 via capacitive coupling. At this time, 4 comparator operations are necessary, so that it is necessary to cut off the output of $C_5$ and $C_6$. The technology of FIG. 17 and 18 is used to do this. The $V_{out}$ obtained in this manner is $S_{-2}$.

In the next operation, after the B data series have been moved to shift register 2003, the data are shifted one place to the left, and transferred to operational circuit 2004, and the same type of operation is conducted to determine $S_{-1}$. Similar operations are repeated to find $S_0$, $S_1$, and $S_2$ and the value of n having the smallest value is determined.

$S_n$ is obtained in a successive time series; this may be temporarily stored in an analog memory, and the value of n giving the minimum value may be specified using a WTA such as that shown, for example, in FIG. 5.

Alternatively, size comparisons may be conducted with respect to the successively appearing values of $S_n$ and the value of n giving the smaller value may be constantly followed. If the present embodiment of the present invention is employed, it is possible to execute operations which find the degree of agreement using smaller scale circuitry.

Furthermore, a shift register 2003 was employed here; however, a switch matrix, for example, may be employed, and the prescribed data series may be selected by means of switches and conducted to operational circuit 2004.

In the first through fifth embodiments described above, the analog memory elements were not specified; however, it is of course the case that any technology may be used for these. For example, analog data may be stored as a charge in capacitors, and these may be read out by a source follower circuit. Alternatively, the data may be stored in the base capacity of bi-polar transistors, and may be read out by an emitter follower circuit. If necessary, storage maybe conducted as digital data, or a many-valued memory (for example, that of R. Au, et, al., ISSCC' 94 Digest of Technical Papers, pp.270–271) maybe employed. Furthermore, with respect to the image sensor, it is of course the case that any technology may be employed, such as, for example, a CCD (charge conduction device), a MOS image sensor, a bi-polar image sensor, or the like.

Furthermore, the circuit of the present invention can be realized using extremely small scale circuitry, so that it may be integrated together with a one dimensional image sensor or two dimensional image sensor on the same chip, and is thus optimal for data processing in which image data are captured and operations are instantly executed with respect to these data. It is especially suited to conducting such operations. However, if the image sensor is on a separate chip, this does not depart from the essential features of the present invention. After two dimensional image data have been subjected one by one to A/D conversion, and incorporated in a frame memory comprising DRAM sets or the like, processing may be conducted using the circuit of the present invention. At this time, the D/A conversion employs a ratio having sizes in which the capacity values are multiples of 2, such as 1, 2, 4, 8, . . . , and the conversion takes advantage of the capacitive coupling with the floating gate. That is to say, D/A conversion may be easily conducted at this floating gate as the output of a controlled source follower circuit. Alternatively, this floating gate may be the floating gate (603*a,* 604*a*) of, for example, an absolute value operational circuit (FIG. 6(*a*)). If this is done, there is no gain drop as a result of the source follower, and it is possible to execute operations having a higher degree of accuracy.

Furthermore, all the circuits of the present invention may be directly integrated on a DRAM chip comprising frame memory, or may be placed in one portion of a microprocessor chip. That is to say, the circuitry of the present invention may be combined as one block within a purely digital circuit, and in the exclusively digital operations, may be employed as an acceleration engine with respect to special jobs which aids those operations requiring an enormous amount of time.

Industrial Applicability

By means of the present invention, it becomes possible to conduct operations with respect to an enormous amount of analog data such as image data and to determine the logic thereof, and as a result, it is possible to execute extremely high speed data processing using simple operational circuitry.

What is claimed is:

1. A semiconductor operational circuit which executes a predetermined operation with respect to a first signal train of signals $A_1, A_2, \ldots, A_{N-1}, A_N$ (where N is a positive integer) of N signals numbered from 1 to N, and a second signal train of signals $B_1, B_2, \ldots, B_{M-1}, B_M$ (where M is a positive integer) of M signals numbered from 1 to M, said circuit comprising:

a plurality of first operational circuits for executing a predetermined operation with respect to $A_i$ and $B_{i+n}$ (where i is a positive integer and n is a positive or negative integer and $1 \leqq i \leqq n$ and $1 \leqq i+n \leqq M$) and generating an output signal $C_{i,n}$;

at least one second operational circuit for, one of generating, the sum $S_n$ of at least a part of output signals of the first operational circuits with respect to a predetermined value of n, where i has differing values, and generating a predetermined signal $T_n$ determined by the sum $S_n$; and a third operational circuit for finding one of the value of $S_n$ and $T_n$ with respect to a plurality of different n values and for determining the n value for which the maximum or minimum value of $S_n$ or $T_n$ is given.

2. A semiconductor operational circuit in accordance with claim 1, wherein said first operational circuits have the function of generating a voltage signal $C_{i,n}$ which increases monotonically along with the absolute value of $A_i - B_{i+n}$.

3. A semiconductor operational circuit in accordance with claim 1, wherein said first operational circuits have the function of generating a voltage signal $C_{i,n}$ which decreases monotonically along with the absolute value of $A_i - B_{i+n}$.

4. A semiconductor operational circuit in accordance with claim 1, wherein said first operational circuits are provided with a pair of MOS type transistors having channels of the same conductivity type, and source electrodes of these transistors are connected to one another and form a terminal generating an output voltage.

5. A semiconductor operational circuit in accordance with claim 4, including means is provided for placing gate electrodes of the pair of MOS type transistors in an electrically floating state.

6. A semiconductor operational circuit in accordance with claim 1, wherein said first operational circuits have the function of outputting a voltage signal having a high level representing a logical value of '1' when the value $A_i - B_{i+n}$ is smaller than a predetermined value, and outputting a voltage signal having a low level representing a logical value of '0' in other cases.

7. A semiconductor operational circuit in accordance with claim 1, wherein said first operational circuits have the function of outputting a voltage signal having a low level representing a logical value of '0' when the value of $A_i - B_{i+n}$ is less than a predetermined value, and outputting a voltage signal having a high level representing a logical value of '1' in other cases.

8. A semiconductor operational circuit in accordance with claim 1, wherein said second operational circuit is provided with a first electrode in an electrically floating state coupled via a capacitance with output electrodes of said first operational circuits, and furthermore incorporates at least a MOS type transistor, the ON/OFF state of which is controlled by said first electrode.

9. A semiconductor operational circuit in accordance with claim 1, comprising a second circuit group comprising a plurality of first circuit groups in which said first operational circuits are linearly disposed, wherein one signal among the first signal train and one signal among the second signal train are supplied in differing combinations to respective said first operational circuits in said second circuit group.

10. A semiconductor operational circuit in accordance with claim 9, wherein said second operational circuit is appended to each said first circuit group.

11. A semiconductor operational circuit in accordance with claim 1, wherein a means is provided for conducting a plurality of prescribed connected signal series from a first signal within one of said first and second signal train to said plurality of first operational circuits, conducting a plurality of prescribed connected signal series from a second signal to said plurality of first operational circuits after calculating prescribed signals $S_n$ or $T_n$, and calculating prescribed signals $S_n$ or $T_n$ with respect to differing values of n.

12. A semiconductor operational circuit in accordance with claim 1, including a plurality of semiconductor photo sensors are integrated on a single semiconductor substrate and connected to said first operational circuits.

13. A semiconductor operational circuit in accordance with claim 1, wherein at least one sensor series comprising a plurality of semiconductor photo sensors wired in a straight line manner is provided, and at least a portion of a signal series obtained from said sensor series, or a signal series resulting from the execution of prescribed operational processing thereon, forms at least one of said first and second signal trains.

14. A semiconductor operational circuit in accordance with claim 1, wherein a sensor group is provided in which semiconductor photo sensors are arranged in a two dimensional matrix form, and signals resulting from the addition of signals obtained by the photo sensors, or signals resulting from the execution of prescribed operations thereon, which are added in the columnar direction for each column and/or are added in the row direction for each row form a part of the first or second signal trains.

15. A semiconductor operational circuit in accordance with claim 1, wherein a means is provided for executing prescribed operational processing with respect to image data incorporated at three continuous times $t_1$, $t_2$, and $t_3$, and a means is provided for generating the first or second signal trains by determining, with respect to signals corresponding to image data at times $t_1$, $t_2$, and $t_3$ on which prescribed operational processing has been executed, the absolute value of the difference between the signals of times $t_1$ and $t_2$, and for generating a second or first signal series by finding the absolute value of the difference between the signals of times $t_2$ and $t_3$.

16. A semiconductor operational circuit in accordance with claim 15, wherein the prescribed operational processing is processing in which signals of the two dimensional photo sensor array arranged in the form of a matrix are added by one of row and by column.

* * * * *